(12) United States Patent
Tanaka

(10) Patent No.: US 7,551,223 B2
(45) Date of Patent: Jun. 23, 2009

(54) APPARATUS, METHOD, AND COMPUTER PROGRAM FOR IMAGING AND AUTOMATIC FOCUSING

(75) Inventor: Kentaro Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 10/743,760

(22) Filed: Dec. 24, 2003

(65) Prior Publication Data

US 2004/0189856 A1    Sep. 30, 2004

(30) Foreign Application Priority Data

Dec. 26, 2002  (JP)  ............................ P2002-376100
Dec. 26, 2002  (JP)  ............................ P2002-376101

(51) Int. Cl.
*H04N 5/232*  (2006.01)

(52) U.S. Cl. ..................................... 348/346

(58) Field of Classification Search ................. 348/345, 348/346, 333.02, 333.03; 396/79, 121, 103, 396/124

See application file for complete search history.

(56) References Cited

U.S. PATENT DOCUMENTS

| | | | | |
|---|---|---|---|---|
| 4,614,975 A * | 9/1986 | Kaite | ........................... | 348/354 |
| 5,121,152 A * | 6/1992 | Wagner | ....................... | 348/345 |
| 5,225,940 A * | 7/1993 | Ishii et al. | ..................... | 348/353 |
| 5,629,735 A * | 5/1997 | Kaneda et al. | ............... | 348/345 |
| 6,388,707 B1 * | 5/2002 | Suda | ...................... | 348/333.03 |
| 6,493,027 B2 * | 12/2002 | Ohta et al. | ................ | 348/220.1 |
| 6,522,360 B1 * | 2/2003 | Miyawaki et al. | ....... | 348/333.03 |
| 6,785,469 B1 * | 8/2004 | Ide et al. | ....................... | 396/121 |
| 6,919,927 B1 * | 7/2005 | Hyodo | .................... | 348/333.02 |
| 6,972,799 B1 * | 12/2005 | Hashimoto | ................... | 348/345 |
| 6,975,361 B2 * | 12/2005 | Kamon et al. | ................ | 348/375 |
| 6,977,687 B1 * | 12/2005 | Suh | ............................ | 348/345 |
| 7,034,881 B1 * | 4/2006 | Hyodo et al. | ........... | 348/333.12 |
| 7,071,985 B1 * | 7/2006 | Onoda et al. | ................ | 348/349 |
| 7,171,625 B1 * | 1/2007 | Sacchi | ......................... | 715/754 |
| 2001/0012072 A1 * | 8/2001 | Ueno | ..................... | 348/333.02 |
| 2002/0018136 A1 * | 2/2002 | Kaji et al. | .............. | 348/333.02 |
| 2003/0142880 A1 * | 7/2003 | Hyodo | ......................... | 382/274 |

(Continued)

FOREIGN PATENT DOCUMENTS

JP    2-83516    6/1990

(Continued)

*Primary Examiner*—Lin Ye
*Assistant Examiner*—Jason T Whipkey
(74) *Attorney, Agent, or Firm*—Oblon, Spivak, McClelland, Maier & Neustadt, P.C.

(57) ABSTRACT

In a still image shooting mode, when a user does not specify a position of an AF frame, an AF process is performed for an AF region of a comparatively large range whose center is in a center of a shooting frame. When the user taps on any position in an EVF area, a touch panel superimposed on a display detects its coordinates. An AF region smaller than the AF region when the user does not specify the position of the AF frame is arranged so that a center of the AF frame is on the coordinates. The AF process is carried out for the smaller AF region. When the user taps on the EVF area 221 twice at a short predetermined interval, a PDA returns the AF region to a state where the position of the AF frame 261 is not specified by the user.

31 Claims, 27 Drawing Sheets

U.S. PATENT DOCUMENTS

2003/0174230 A1* 9/2003 Ide et al. .................. 348/345
2005/0007486 A1* 1/2005 Fujii et al. ................. 348/345

FOREIGN PATENT DOCUMENTS

| | | |
|---|---|---|
| JP | 02-240643 | 9/1990 |
| JP | 3-91727 | 4/1991 |
| JP | 3-187580 | 8/1991 |
| JP | 4-150681 | 5/1992 |
| JP | 6-70206 | 3/1994 |
| JP | 6-113187 | 4/1994 |
| JP | 7-311330 | 11/1995 |
| JP | 11-142725 | 5/1999 |
| JP | 11-196312 | 7/1999 |
| JP | 11-355617 | 12/1999 |
| JP | 2001-78072 | 3/2001 |
| JP | 2001-159730 | 6/2001 |
| JP | 2002-196229 | 7/2002 |
| JP | 2002-311489 | 10/2002 |
| JP | 2002-365519 | 12/2002 |

* cited by examiner

F I G. 1 1
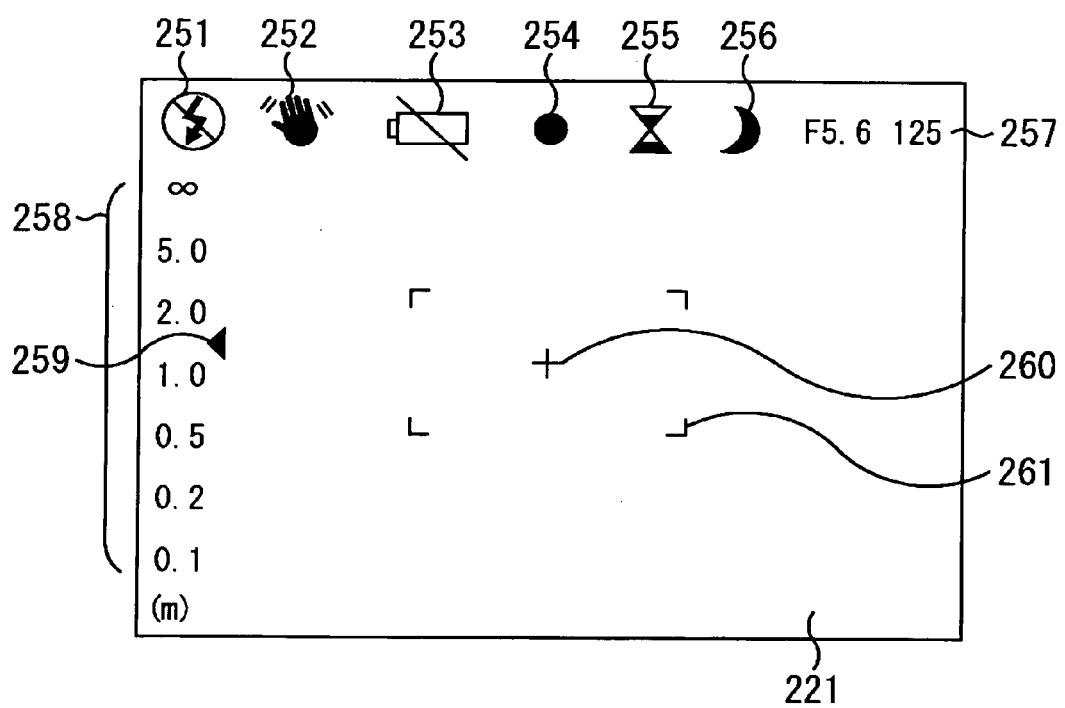

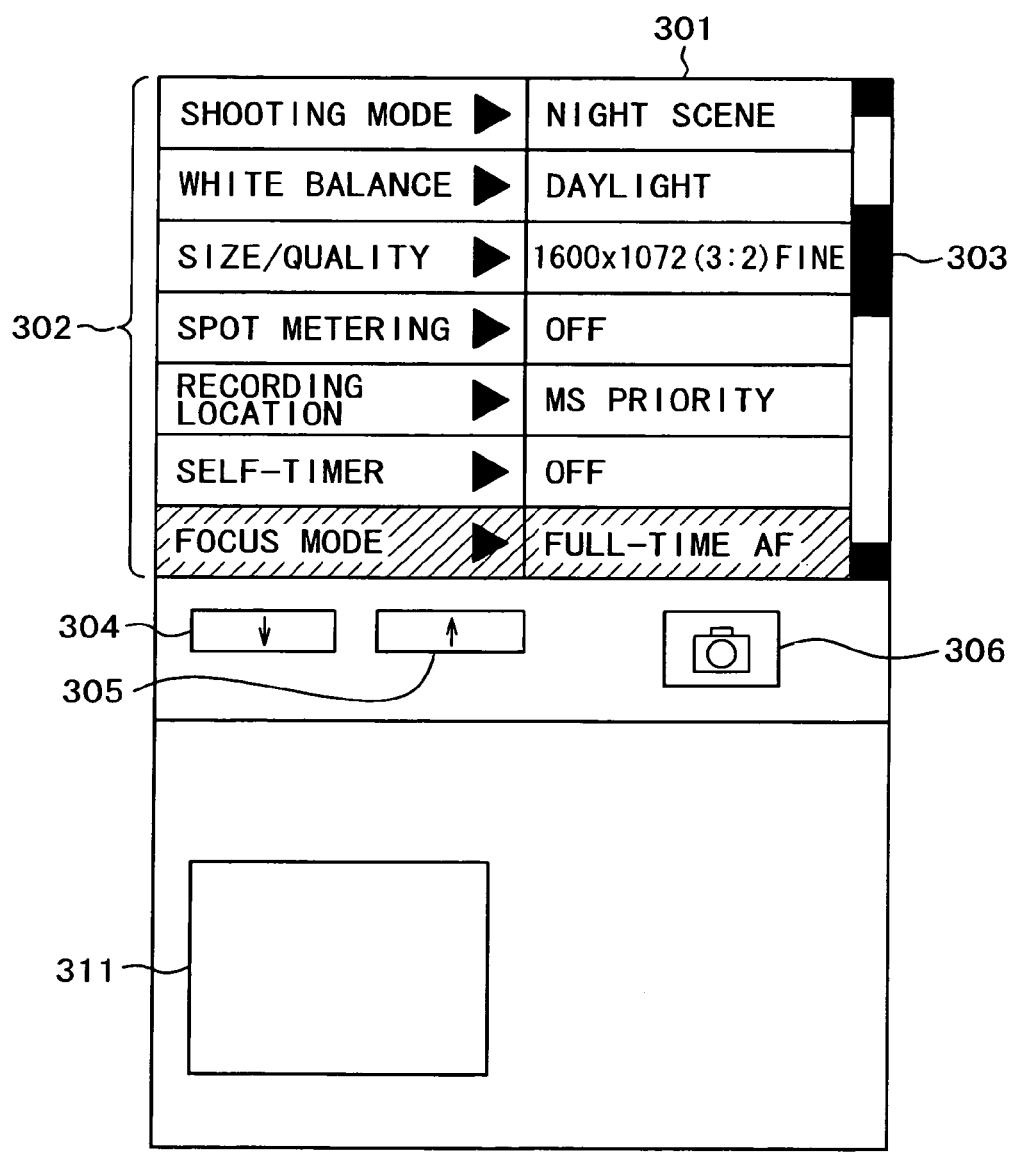

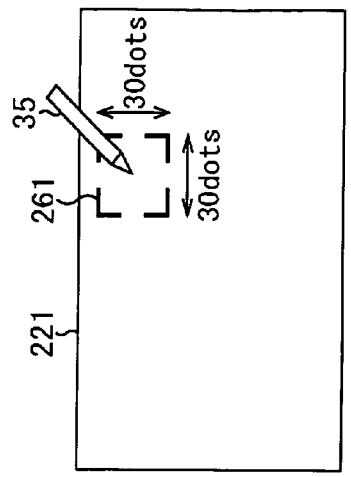
F I G. 1 4 B
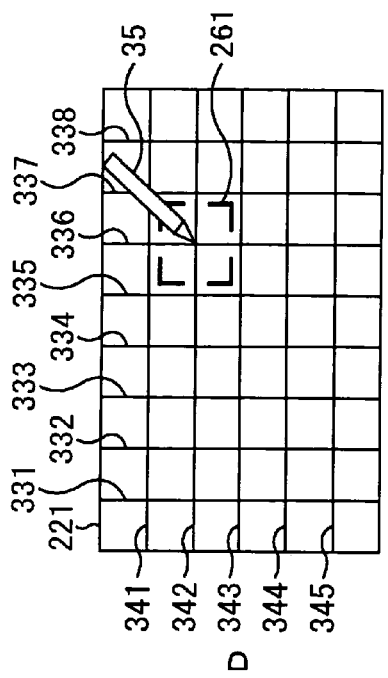
F I G. 1 4 D
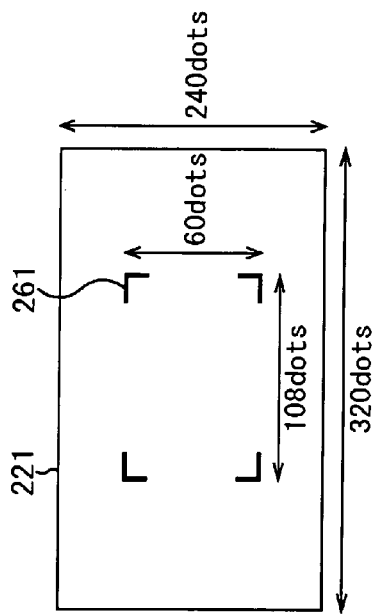
F I G. 1 4 A
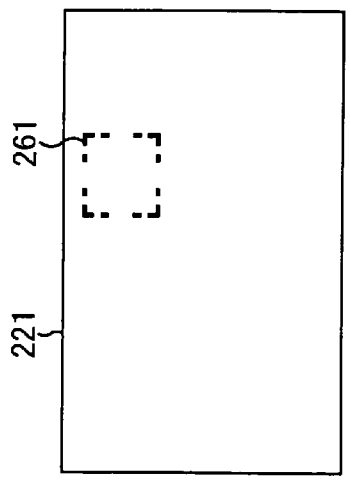
F I G. 1 4 C

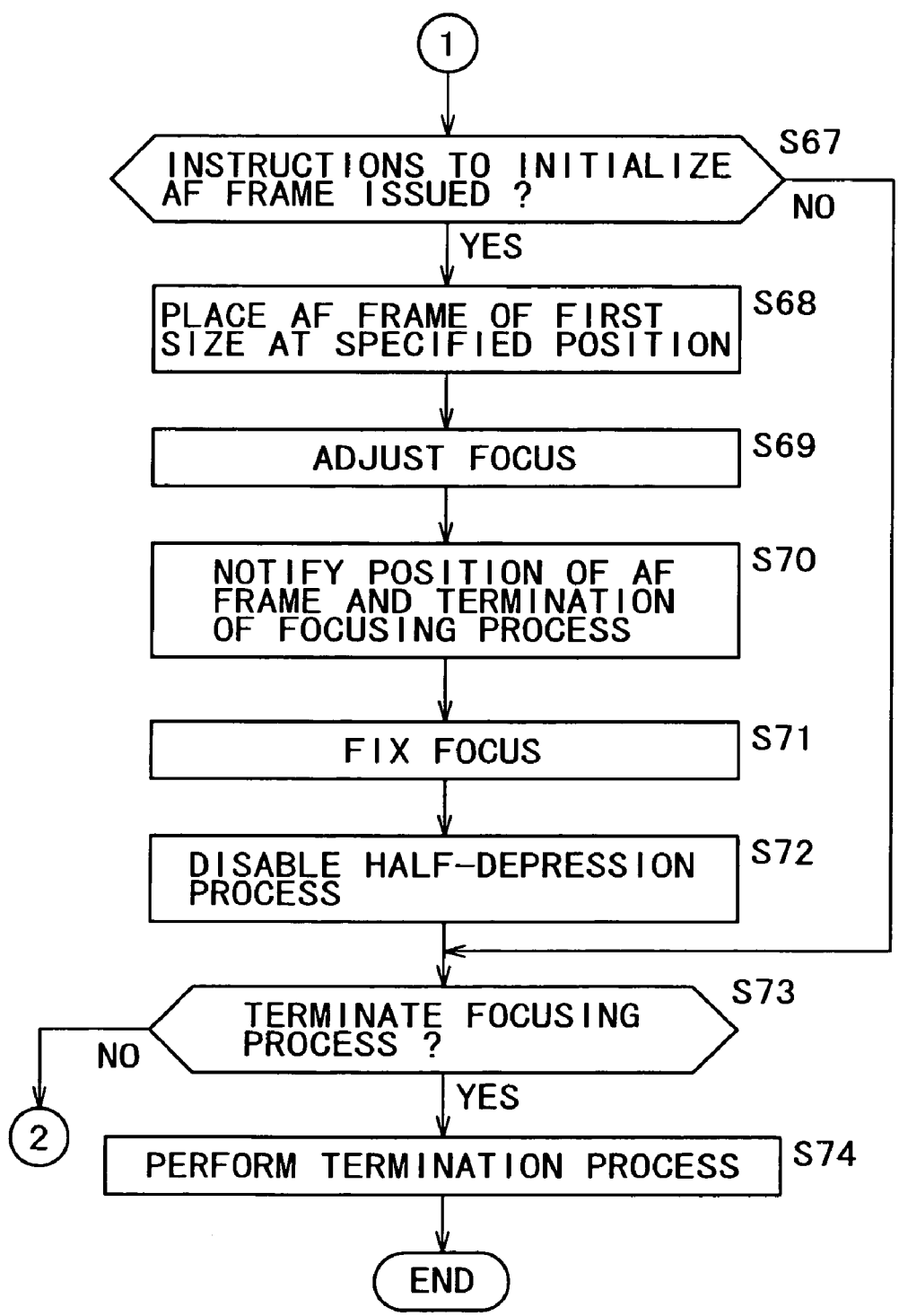

F I G. 2 0
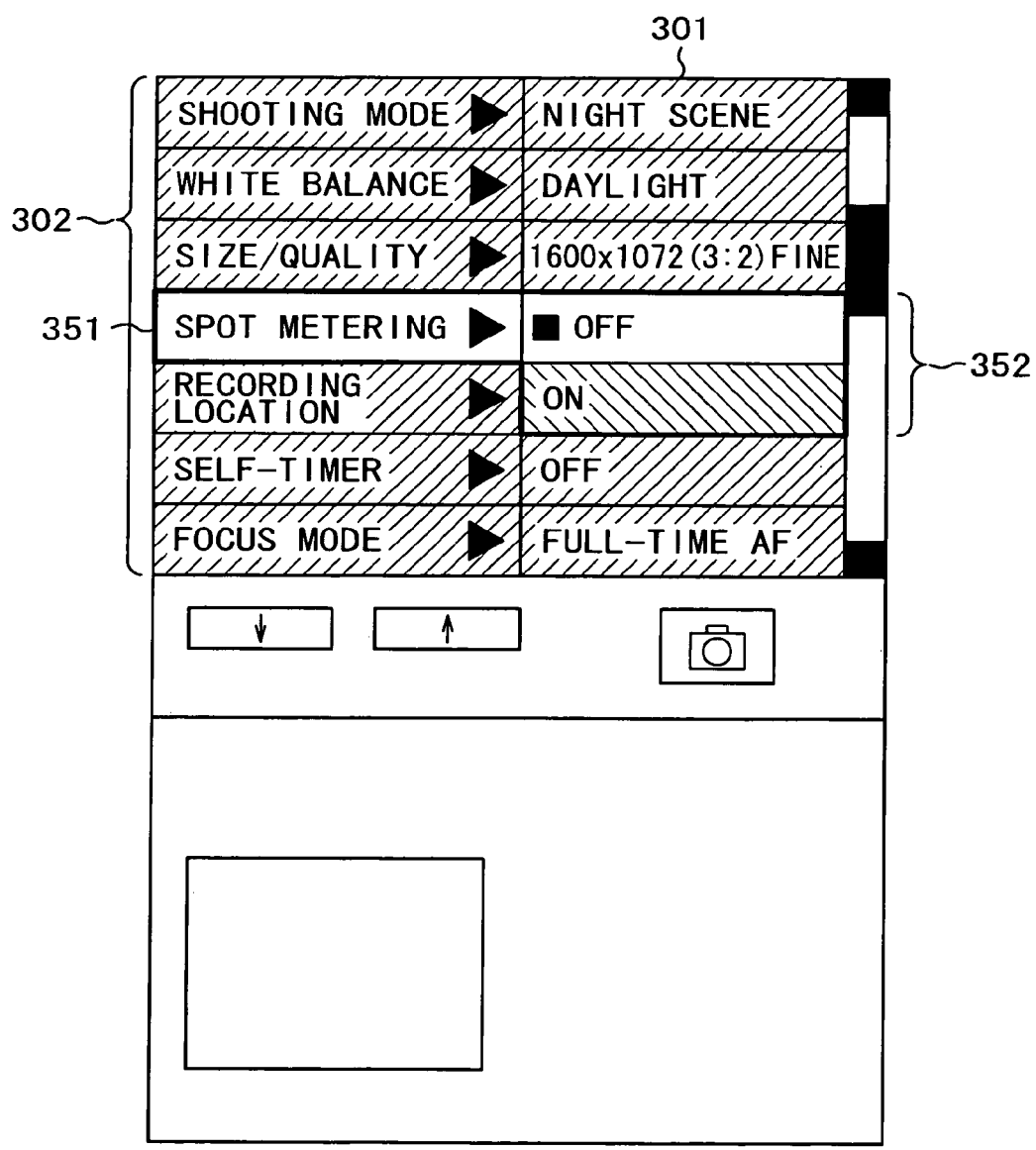

APPARATUS, METHOD, AND COMPUTER PROGRAM FOR IMAGING AND AUTOMATIC FOCUSING

CROSS REFERENCES TO RELATED APPLICATIONS

The present invention claims priority to its priority documents No. 2002-376100 and 2002-376101, both filed in the Japanese Patent Office on Dec. 26, 2002, the entire contents of which being incorporated by reference herein.

BACKGROUND OF THE INVENTION

1. Field of the Invention

The present invention relates to an apparatus and method for imaging and a computer program, and specifically, to an apparatus and method for imaging and a computer program that allows execution of more suitable automatic focusing.

2. Related Art

In recent years, small electric devices having an imaging function, as typified by a digital still camera and a PDA (Personal Digital Assistants) having the imaging function, have been spreading, and enhanced imaging functions thereof have also been developed.

For example, these imaging apparatuses typically include a display such as an LCD (Liquid Crystal Display) to allow display of an image taken in through a lens, so that a user may take an image of a subject to be imaged (hereafter, referred to as photographic subject) while observing the displayed image and checking its image composition.

There is also an imaging apparatus that allows to adjust an automatic focusing function (hereinafter referred to as AF (Auto Focus)), automatic exposure control (hereinafter referred to as AE (Auto Exposure)), etc, by overlying a touch panel on the display, as well as allowing the user to not only check the picture composition but also operate the touch panel overlaid on the display.

For example, if the user selects a photographic subject of an intake image displayed on a display provided in a digital still camera, the digital still camera detects its position by means of the touch panel overlaid on the display, and focuses on the photographic subject in the position selected by the user (see Patent document 1, for example).

[Patent Document 1]
Japanese Patent Application Laid Open JP H11-355617 (pp 5-7, and FIGS. 5-7).

SUMMARY OF THE INVENTION

If the user does not specify a position to be focused on, AF is directed to a region near a center within a range of image that is converted into an image signal by an imaging device (hereafter referred to as a shooting frame). In this case, however, it is more preferable to render the region somewhat larger than the imaging frame, in order to avoid an unfocused object phenomenon in which a region subject to AF may be away from the photographic subject desired by the user because a size of the photographic subject etc. could not be specified.

If the user specifies a position to be focused, it means that the user usually specifies the photographic subject desired by the user or a specific portion of the photographic subject. Accordingly, it is preferable that a region subject to AF is smaller than that of the case where the position to be focused is not specified so as that other photographic subjects (positions which are not desired by the user) may not be in focus.

However, such methods may pose a problem such that only a position of the region subject to AF may be controlled and, sometime, a focusing is made at a position different from the one at which the user would like to focus.

In view of such situations, it is desirable to provide more suitable automatic focusing.

According to an embodiment of the present invention, an imaging apparatus is provided. The imaging apparatus includes: imaging means for imaging a subject to be imaged and taking in a moving image and a still image of the subject; focusing means for adjusting a focal length and focusing on the subject which is included in a first predetermined region within an imaging range of the imaging means; reception means for receiving a designation regarding a position in the first region within the imaging range, the designation being inputted by a user; and position setting means for setting the first region at a position within the imaging range, based on the position designation received by the reception means.

According to another embodiment of the present invention, an imaging method is provided. The imaging method includes: imaging a subject and taking in a moving image and a still image of the subject; adjusting a focal length and focusing on the subject which is included in a first predetermined region within an imaging range of the imaging means; receiving a designation regarding a position in the first region within the imaging range, the designation being inputted by a user; and setting the first region at a position within the imaging range, based on the position designation received.

According to another embodiment of the present invention, a program for causing a computer to perform an imaging process is provided. The imaging process includes: a imaging step for imaging a subject to be imaged and taking in a moving image and a still image of the subject; a focusing step for adjusting a focal length and focusing on the subject which is included in a first predetermined region within an imaging range of the imaging means; a reception step for receiving a designation regarding a position in the first region within the imaging range, the designation being inputted by a user; and a position setting step for setting the first region at a position within the imaging range, based on the position designation received by the reception means.

In another embodiment of present invention there is provided an imaging apparatus that includes: imaging means for imaging a photographic subject and taking in a moving image and a still image of the photographic subject; focusing means for adjusting a focal length and focusing on the photographic subject which is included in a first predetermined region within an imaging range of the imaging means; reception means for receiving a designation regarding a position of the first region within the imaging range, the designation being inputted by a user; position setting means for setting the first region at a position within the imaging range, based on the designation received by the reception means; and range setting means for setting up a range of the first region according to the position set up by the position setting means.

When the position designation is not received by the reception means, the position setting means may set up the position of the first region so that a center of the first region may be located at a center of the imaging range.

When the position designation is received by the reception means, the position setting means may set up the position of the first region so that the center of the first region may be located at coordinates specified by the user.

When the position designation is received by the reception means, the range setting means may set up the range of the first region so as to be smaller than the range of the first region in case the position designation is not received.

The imaging apparatus of the present embodiment may further include display means for displaying the moving image obtained by imaging the photographic subject by the imaging means, in which the reception means is configured to include a touch panel overlaid. on the display means, detect the coordinates inputted by a first method while allowing the user to check the moving image displayed on the display means, and receive the coordinates as the position designation.

The first method may be such that the user taps on the touch panel once.

The imaging apparatus of the present embodiment may further include initialization means for initializing the setup of the first region and returning the setup from a state where the position designation is received by the reception means to a state where the position designation is not received, in which the reception means further receives an instruction to initialize the setup of the first region inputted by the user with a second method, so that the initialization means may initialize the setup of the first region, based on the instruction received by the reception means.

The second method may be such that the user taps on the touch panel twice within a predetermined time period.

The second method may be such that the user taps on the touch panel so as to be in contact therewith for more than a predetermined period of time period.

When the focusing means focuses on the photographic subject that is included in the first region, the display means may superimpose an outer frame of the first region on the moving image and cause it to blink a predetermined number of times.

The focusing means may adjust the focal length and focus on the photographic subject, when the imaging means take in the still image and when the position setting means set up the position of the first region.

The imaging apparatus of the present embodiment may further include prohibition means for prohibiting an adjusting process by the focusing means in case the imaging means takes in the still image and when the focusing means focuses on the photographic subject included in the first region, The imaging apparatus of the present embodiment may further include exposure adjustment means for adjusting an exposure for a second predetermined region within the imaging range, in which the position setting means may further set up the position of the second region so that a center of the second region may be located at a center of the first region that is set at the arbitrary position within the imaging range, based on the position designation received by the reception means.

In another embodiment of present invention, there is provided an imaging method that includes: an intake control step of controlling intake of a moving image and a still image of a photographic subject imaged in an imaging section; a focusing step of adjusting a focal length of the imaging section and focusing on the photographic subject included in a first predetermined region within an imaging range of the imaging section; a reception control step of controlling a reception of a designation with respect to a position of the first region within the imaging range, the designation being inputted by a user; a position setting step of setting the first region at an arbitrary position within the imaging range, based on the position designation received and controlled by a process of the reception control step; and a range setting step of setting up a range of the first region according to the position set by a process of the position setting step.

In another embodiment of present invention, there is provided a computer program for causing a computer to execute: an intake control step of controlling intake of a moving image and a still image of a photographic subject imaged in an imaging section; a focusing step of adjusting a focal length of the imaging section and focusing on the photographic subject included in a first predetermined region within an imaging range of the imaging section; a reception control step of controlling a reception of a designation with respect to a position of the first region within the imaging range, the designation being inputted by a user; a position setting step of setting the first region at an arbitrary position within the imaging range, based on the designation received and controlled by a process of the reception control step; and a range setting step of setting up a range of the first region according to the position set by a process of the position setting step.

According to still another embodiment of the present invention, an imaging apparatus is provided. The imaging apparatus includes: imaging means for imaging a subject to be imaged and taking in a moving image and a still image of the subject; focusing means for adjusting a focal length and focusing on the subject which is included in a first predetermined region within an imaging range of the imaging means; reception means for receiving a designation regarding a position at the first region within the imaging range, the designation being inputted by a user; position setting means for setting the first region at a position within the imaging range, based on the position designation received by the reception means; range setting means for setting up a range of the first region in accordance with the position set up by the position setting means; and prohibition means for prohibiting adjustment of the focal length by the focusing means; wherein the focusing means adjust the focal length and focus on the subject if the imaging means take in the still image and if the position setting means set up the position of the first region; and the prohibition means prohibit the adjustment of the focusing means if the focusing means focus on the subject that is included in the first region and if the imaging means takes in the still image.

According to still another embodiment of the present invention, an imaging apparatus is provided. The imaging apparatus includes: an imaging section for imaging a subject to be imaged and taking in a moving image and a still image of the subject; a focusing section for adjusting a focal length and focusing on the subject which is included in a first predetermined region within an imaging range of the imaging section; a reception section for receiving a designation regarding a position in the first region within the imaging range, the designation being inputted by a user; and a position setting section for setting the first region at a position within the imaging range, based on the position designation received by the reception section.

In the apparatus and method for imaging and the computer program according to the embodiments of the present invention, the photographic subject is imaged; the moving image and the still image of the photographic subject are taken in; the focal length is adjusted; the photographic subject included in the first predetermined region within the imaging range is focused; the designation, inputted by the user, of the position of the first region within the imaging range is received; and the first region is set at the arbitrary position within the imaging range, based on the designation.

According to the present invention, the photographic subject can be imaged, specifically, more suitable automatic focusing may be carried out.

BRIEF DESCRIPTION OF THE DRAWINGS

FIG. 11 is a schematic view showing an example of display of an EVF area of FIG. 10;

FIG. 12 is a schematic view showing an example of structure of a setup screen;

FIGS. 14A to 14D are schematic views showing examples of display of an AF frame;

FIG. 19 is a flow chart following FIG. 18 for explaining the one shot AF process of the PDA of FIG. 1;

FIG. 20 is a schematic view showing another example of structure of the setup screen;

DESCRIPTION OF THE PREFERRED EMBODIMENTS

Figure 1:
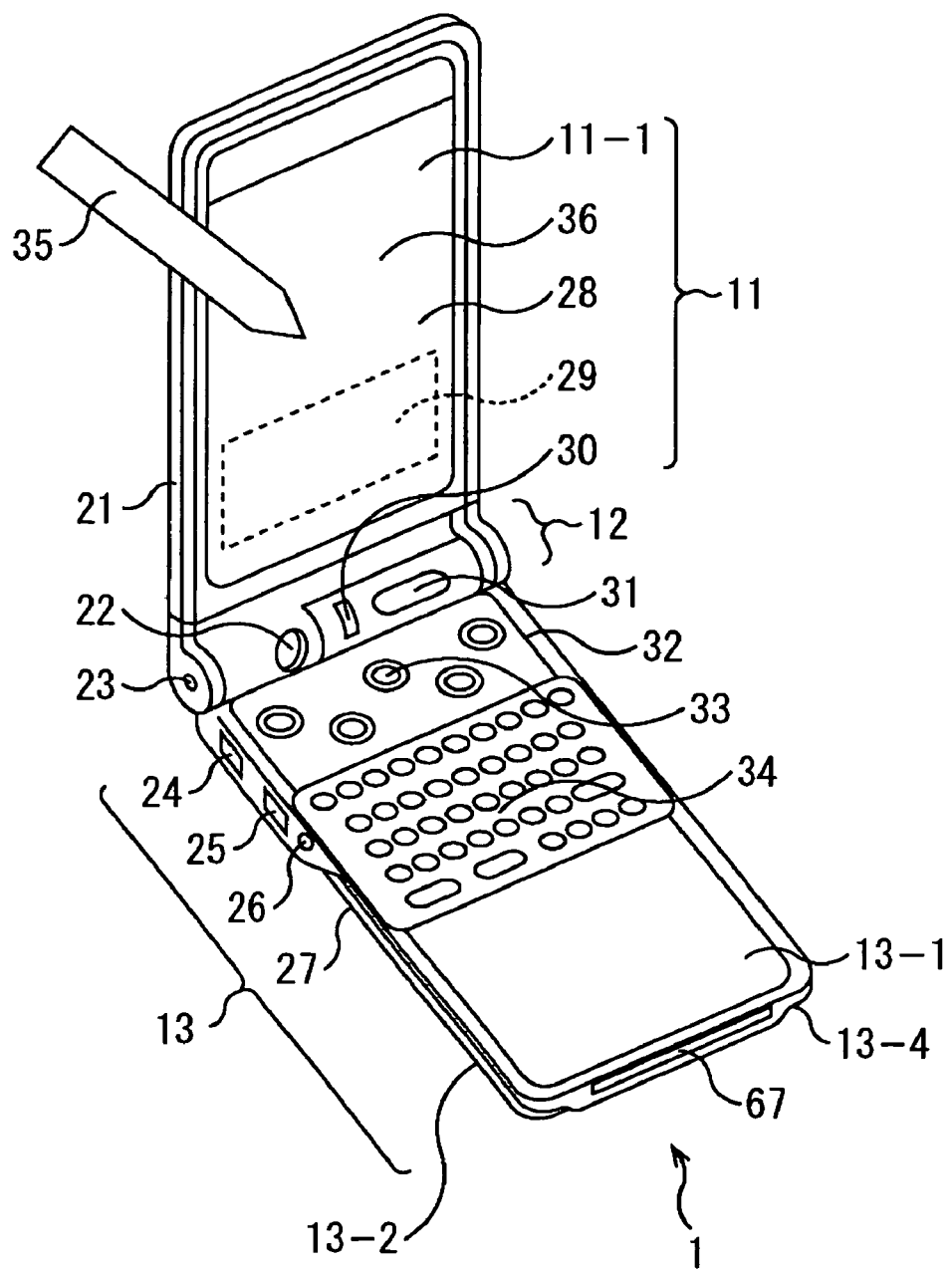
FIG. 1 is a perspective view showing an example of structure of a PDA to which the present invention is applied.

FIG. 1 is a perspective view showing an example of structure of a PDA to which the present invention is applied.

As shown in FIG. 1, the PDA 1 is divided at a central hinge part 12 into a display section 11 and a main body part 13 so as to be foldable at the central hinge part 12.

Figure 3:
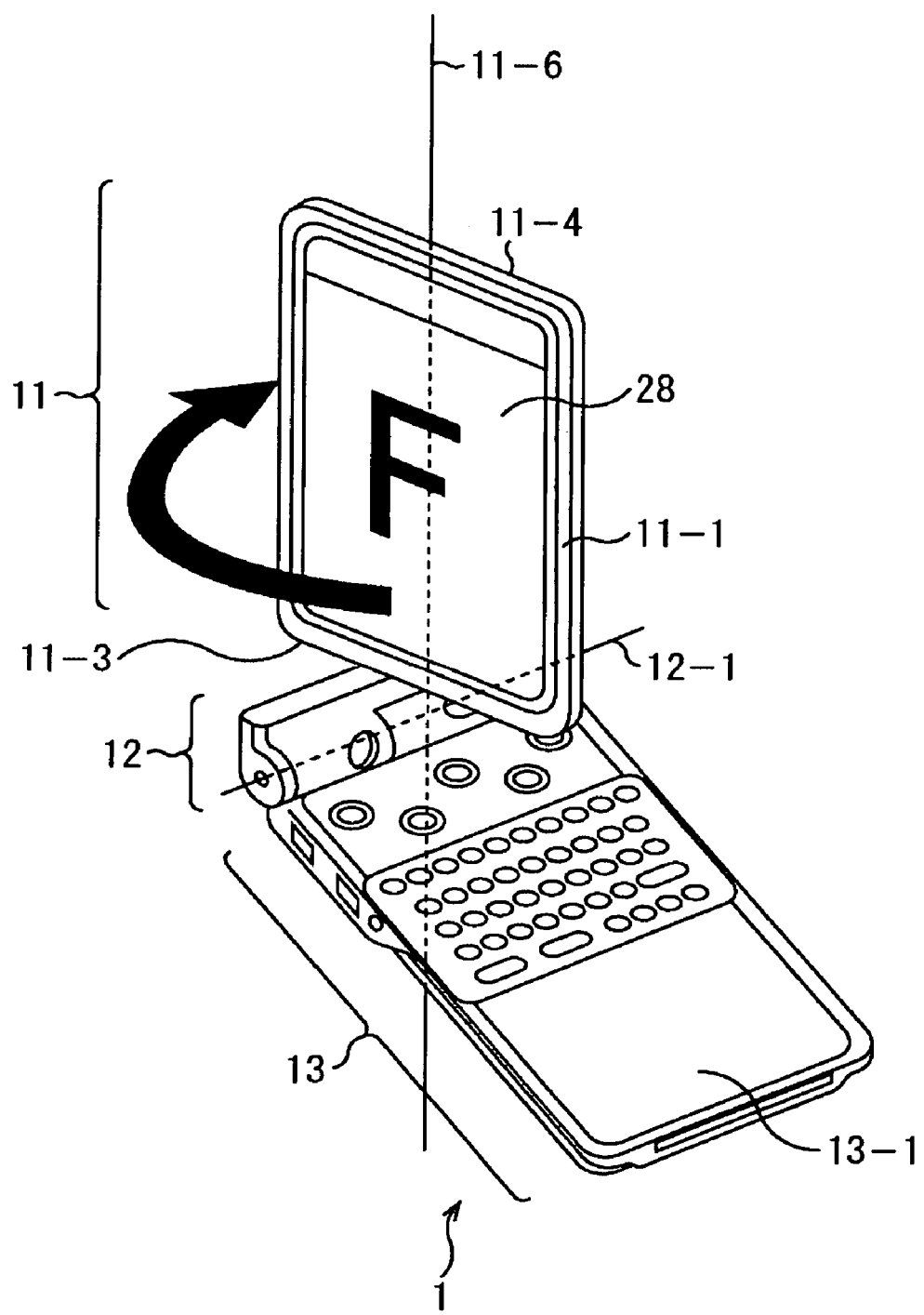
FIG. 3 is a perspective view for explaining a swivel and switching operation of a display section of the PDA of FIG. 1.

In other words, as shown in FIG. 3 as will be described later, the display section 11 is adapted to swivel about an axis 12-1 (hypothetical axis), and be opened or closed with respect to a main body part 13. Further, the display section 11 is adapted to swivel about the main body part 13 and about an axis 11-6 (hypothetical axis) substantially perpendicular to the axis 12-1. That is, the display section 11 is adapted to swivel in parallel with a face 11-3 (face which is perpendicular to a face 11-1 where an LCD 28 is provided and is located at its lower part as shown in FIG. 3) which faces the hinge part 12.

Now returning to FIG. 1, disposed at substantially the whole surface of the face 11-1 of the display section 11 are the LCD (Liquid Crystal Display) 28 and a transparent and pressure-sensitive touch panel 36 laminated to the surface of the LCD 28. In other words, when a touch pen 35 is placed in an arbitrary position on the LCD 28, its coordinates are detected by means of the touch panel 36, and a predetermined process associated with the detected coordinates is carried out.

A character input area 29 for inputting a character is provided in a predetermined region (region at the lower part of the LCD 28 as shown in the figure) of a touch panel 36, and various software buttons, a character input area, etc. are displayed on the character input area 29. If the user operates the touch pen 35 and writes special characters on the character input area, the special character are inputted. That is, a trajectory along which the touch pen 35 has moved is detected by means of the touch panel 36, so that the character corresponding to the trajectory is inputted.

Further, when the user operates the touch pen 35 and depresses the software button 43, a software keyboard, which is a GUI (Graphical User Interface) and has displayed a key layout of a keyboard, is displayed on the character input area 29. When the user operates the touch pen 35 and touches an arbitrary key on the software keyboard, a character (or sign etc.) corresponding to the touched key is inputted. In other words, the coordinates at which the touch pen 35 is placed are detected by means of the touch panel 36, so that the key corresponding to the coordinates is recognized and the character (or sign etc.) assigned to the recognized key is inputted.

In this way, the user can input the character easily and quickly by using the touch pen 35 and the character input area 29 as software functions. In addition, since the touch panel 36 is laminated over the whole display surface of the LCD 28, the position of the character input area 29 with respect to the LCD 28 may not be limited to the position as shown in FIG. 1. For example, as will be described later, if the displayed image is reversed upside down and left to right, the character input area 29 may be disposed at an upper part of the display section 11 in FIG. 1 with upside down display. Accordingly, even in such a case, the user can input the character like the example as described above.

A power button 31, which turns a power supply of the PDA 1 on or off, is provided at the hinge part 12 on the right hand side as shown in FIG. 1. Disposed on the left hand side of the hinge part 12 is an LED (Light Emitting Diode) 30 which is lit when a battery (not shown) built in the PDA 1 is charging and turned off after completion of the charging. In addition, disposed on the left had side of the LED 30 is a camera section 22 including a CCD (Charge Coupled Device). Disposed on the left edge is a mechanical capture button 23, which is operated to image the photographic subject by the camera section 22. The camera section 22 is fixed to a portion, of the hinge part 12, which swivels together with the display section 11 with respect to the main body part 13, so that the user may turn the camera section 22 by opening/closing the display section 11 with respect to the main body part 13 as will be described later.

In other words, when imaging the photographic subject, the user depresses the mechanical capture button 23 once to initiate application software which has a camera function (function which images the photographic subject by the camera section 22, and records the captured image of the photographic subject), and turns the display section 11 to swivel so that an imaging direction of the camera section 22 may be turned to the photographic subject. At this time, since the image (image of the photographic subject) being captured by the camera section 22 is displayed on the LCD 28 as will be described, the user adjusts the position of the camera section 22, while checking the LCD 28. Further, after completion of various kinds of setup processes, the user depresses again the mechanical capture button 23 which operates as a shutter button, whereby the image captured by the camera section 22 at the time when the mechanical capture button 23 is depressed is stored in a memory (such as a RAM 133 of FIG. 8 as will be described later) of the PDA 1.

It should be noted that the mechanical capture button 23 can be operated, as ways for the depression, "full depression" which is to mean depressing to the end of its stroke, and "half depression" which is to mean depressing to a predetermined position which is in the middle of the stroke. For example, if the user does the "half depression" with the mechanical capture button 23, the PDA 1 carries out an AF process, an AE process, etc. for the image to be shot by the camera section 22. Further in such a state, if the user does the "full depression" with the mechanical capture button 23, the PDA 1 captures the image by means of the camera section 22. Thus, according to the ways of depression (depths), the mechanical capture button 23 allows the user to choose the corresponding process to be performed.

When the "full depression" is carried out at the state where the user is not depressing the mechanical capture button 23, a process corresponding to the "full depression" is performed after the PDA 1 performs a process corresponding to the "half depression." In other words, in the case of the above description, when the user does the "full depression", the PDA 1 captures the image by means of the camera section 22 after performing the AF process, the AE process, etc. for the image to be shot by the camera section 22.

Disposed on a face 13-1 which faces the display section 11 when the main body part 13 is folded, at an upper part of the face 13-1 as shown in the figure, is a button 32 on which a symbol showing each of the application software installed in the PDA 1 is printed. When the user depresses the button 32 with the finger, the application software corresponding to it is initiated.

In a central part of a region where the button 32 of the face 13-1 is arranged, a scroll button 33 is provided for scrolling an image displayed on the LCD 28. Further, disposed below the button 32 of the face 13-1 is a keyboard 34 for inputting a character (including a sign etc.).

Disposed at a face (side) 13-2 perpendicular to the face 13-1 of the main body part 13, at an upper part as shown in the figure, is a headphone jack 24 for connecting with a remote controller or external headphones and outputting sound thereto. Below the headphone jack 24, a jog dial 25 which may be freely depressed and rotated is provided projecting slightly from the face 13-2. Below the jog dial, a back button 26 for canceling an immediate preceding operation is provided. Further, below the back button 26, a hold switch 27 is provided for forbidding execution of a function corresponding to a case where another button is depressed accidentally.

A connector 67 for connecting with a device to be attached is provided in a central part of a face (end face at a lower part of the face 13-1 as shown in the figure) 13-4 perpendicular to the face 13-1 of the main body part 13.

Figure 2:
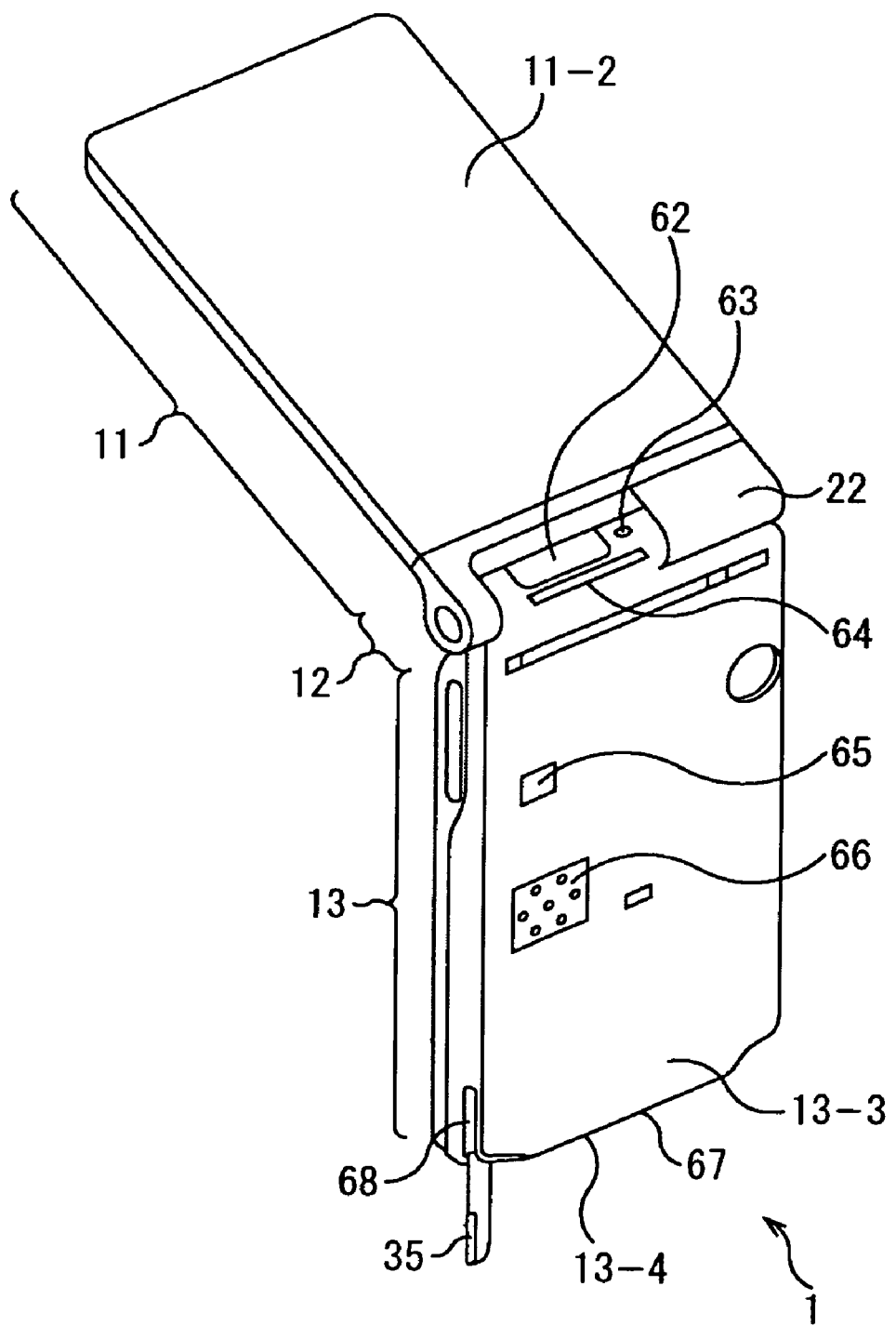
FIG. 2 is a perspective back view showing a back of the PDA of FIG. 1.

FIG. 2 shows an example of structure of a back of the PDA 1. As shown in FIG. 2, disposed on the left-hand side and at an upper part of the hinge part 12 in the figure are a slot 64 to be equipped with a predetermined memory card or an expansion module which can be taken out and inserted freely, a lamp 63 turned on when data in the memory card is read or written, and an infrared port 62 for communicating with another device by infrared rays.

For example, the memory card stores, in a small and thin plastic case, a flash memory element that is a type of EEPROM (Electrically Erasable and Programmable Read Only Memory) which is a nonvolatile memory to be rewritten and erased electrically, thus allowing writing and reading of a variety of information (data), such as an image, sound, music etc.

Further, the memory card employs an original serial protocol which can secure compatibility with a device to be used even in the case of a specification change of the built-in flash memory due to an expansion of memory capacity, etc. so that high-speed performances of the maximum write speed of 1.5 (MB/S) and the maximum read speed of 2.45 (MB/S) may be realized and an erroneous erase prevention switch may be provided so as to secure high reliability.

Thus, the PDA 1 allows such a memory card to be inserted, and therefore may share data with another device through the memory card.

As shown in the figure, a reset button 65 for resetting the PDA 1 is provided on the left-hand side of a central part of a face 13-3 which is on an opposite side of the face 13-1 of the main body part 13. A loud speaker 66 for outputting the sound is provided below the reset button 65.

As described above, the connector 67 is provided in the central part of the face (end face at the lower part as shown in the figure) 13-4 perpendicular to the faces 13-1 and 13-3 of the main body part 13. As shown in the figure, an accommodation part 68, which accommodates the touch pen 35, is provided on the left side.

Now, with reference to the drawings, an opening/closing operation and a swivel operation of the display section 11 will de described hereafter in detail.

Figure 4:
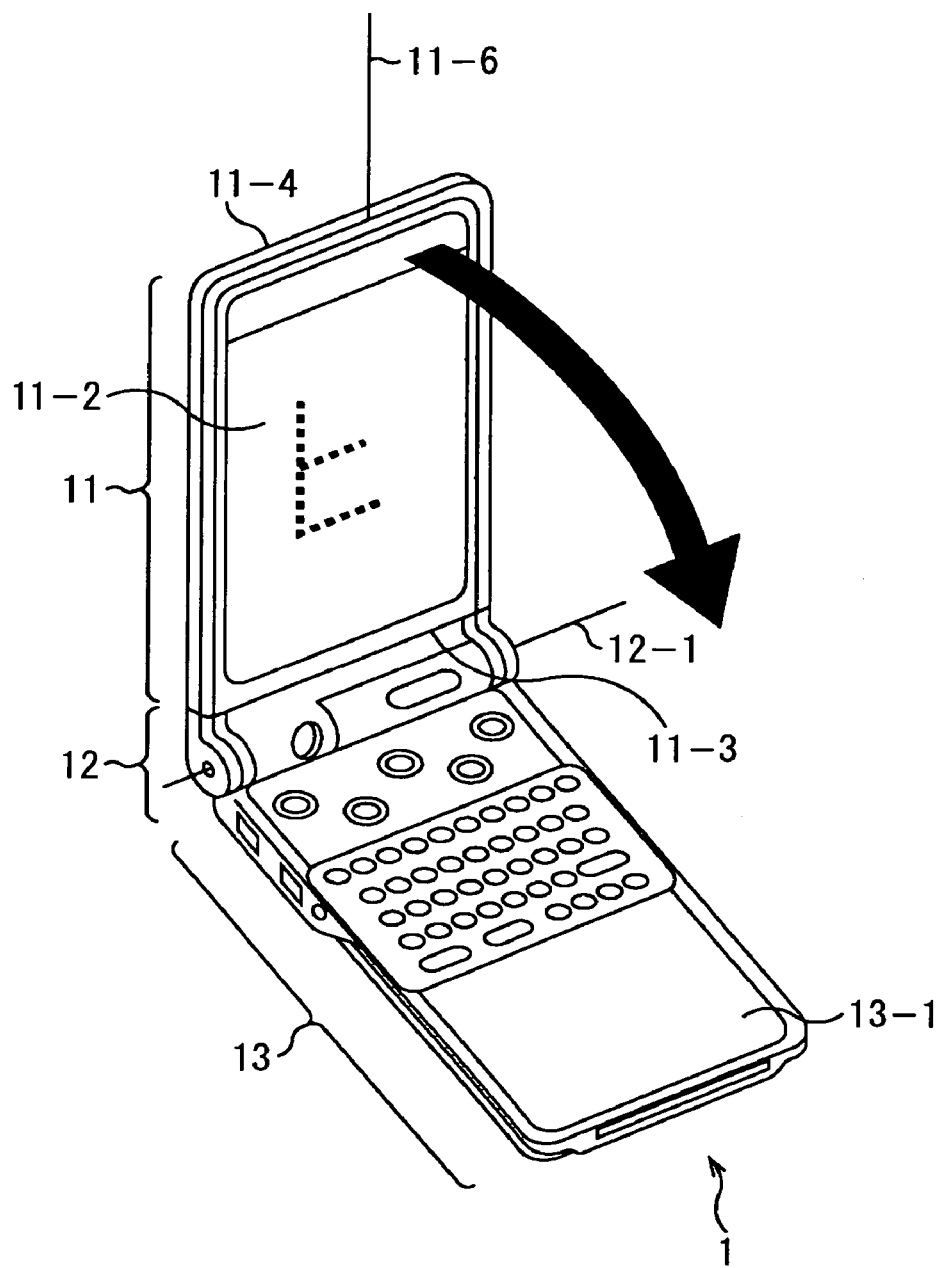
FIG. 4 is a perspective view for explaining the swivel and switching operation of the display section of the PDA of FIG. 1.
Figure 5:
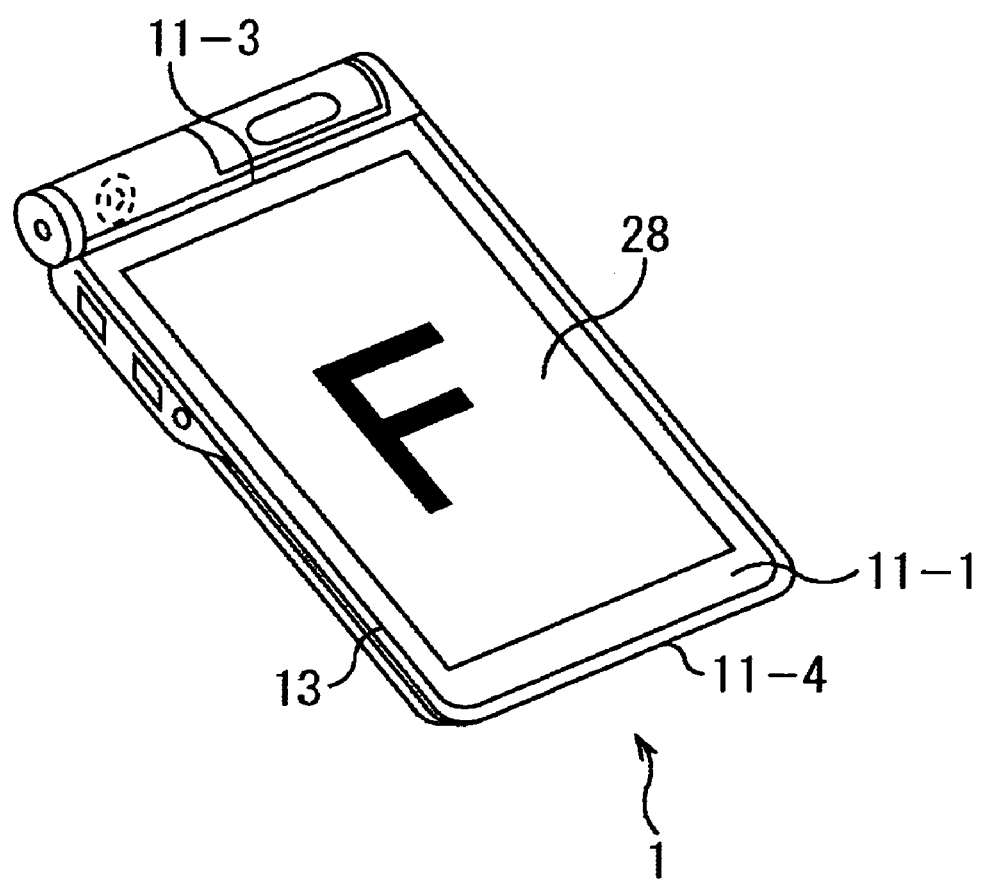
FIG. 5 is a perspective view for explaining the swivel and switching operation of the display section of the PDA of FIG. 1.

As shown in FIG. 3, the user may swivel the display section 11 about the axis 11-6. Further, as shown in FIG. 4, the user may swivel the display section 11 about the axis 11-6 by about 180 degrees, then swivel it about the axis 12-1 so as to close it towards the main body part 13. In other words, as shown in FIG. 5, the user may use the PDA 1 not only in a state as shown in FIG. 1 but also in a state as shown in FIG.5.

For example, it is assumed that a character "F" as shown in FIG. 3 is displayed on the LCD 28, or that an upper part of the character "F" is displayed on a face 11-4 side (upward in FIG. 3) of the display section.

In this situation, when the display section 11 is swiveled from a predetermined reference position, the PDA 1 detects a swivel angle about the axis 11-6 of the display section 11. When the swivel angle is within a predetermined range (in this example, equal to or more than 0 degree and less than 180 degrees) which is within a range where the display section 11 can swivel (in this example, equal to or more than 0 degree and not greater than 180 degrees: assuming that the swivel angle is 0 degree in case the display section 11 is arranged as shown in FIG. 1), the PDA 1 causes the character "F" to be displayed on the LCD 28 such that the upper part of the image (character "F") is directed towards the face 11-4.

On the other hand, if the swivel angle becomes out of the range (in this example, if it becomes 180 degrees), the PDA 1 causes the LCD 28 to display the character "F" such that the upper part of the character "F" is directed towards the face (end face) 11-3 which is on an opposite side of the face (end face) 11-4. In other words, if the swivel angle of the display section 11 becomes out of the predetermined range, the image (for example, the character "F" whose upper part is directed towards the face 11-4) in case the swivel angle is within the range is reversed upside down and left to right so as to become an image (for example, the character "F" whose upper part is directed towards the face 11-3 which is on an opposite side of the face 11-4) which is displayed on the LCD 28 by the PDA 1.

In particular, in the case of the state as shown in FIG. 3, since the swivel angle of the display section 11 is less than 180 degrees (because it is within the predetermined range as mentioned above), the character "F" is displayed on the LCD 28 such that the upper part of the character "F" is directed towards the face 11-4 (upwards in FIG. 3).

On the other hand, in the case of the state as shown in FIG. 4 and FIG. 5, since the swivel angle of the display section 11 is 180 degrees (because it is out of the predetermined range as mentioned above), the character "F" is displayed on the LCD 28 such that its upper part is directed towards the face 11-3 which is on the opposite side of the face 11-4 (the bottom face as shown in FIG. 4).

Thus, the PDA 1 may display the image in a direction natural for the user regardless of the swivel and opening/closing state of the display section 11.

Further, the user may swivel the display section 11 about the axis 12-1 and fold it towards the main body part 13 so as to be closed not only in the state where the PDA 1 is as shown in FIG. 4 but also in the state where it is as shown in FIG. 1. In other words, although its illustration is omitted, the user may protect the PDA 1 (in particular the LCD 28) so as not to permit the PDA 1 to externally expose the LCD 28 as shown in FIG. 5 when the PDA 1 is carried etc.

Further, as described above, the display section 11 may be swiveled so that the user may change a direction of a camera section 22 or a shooting direction.

Figure 6:
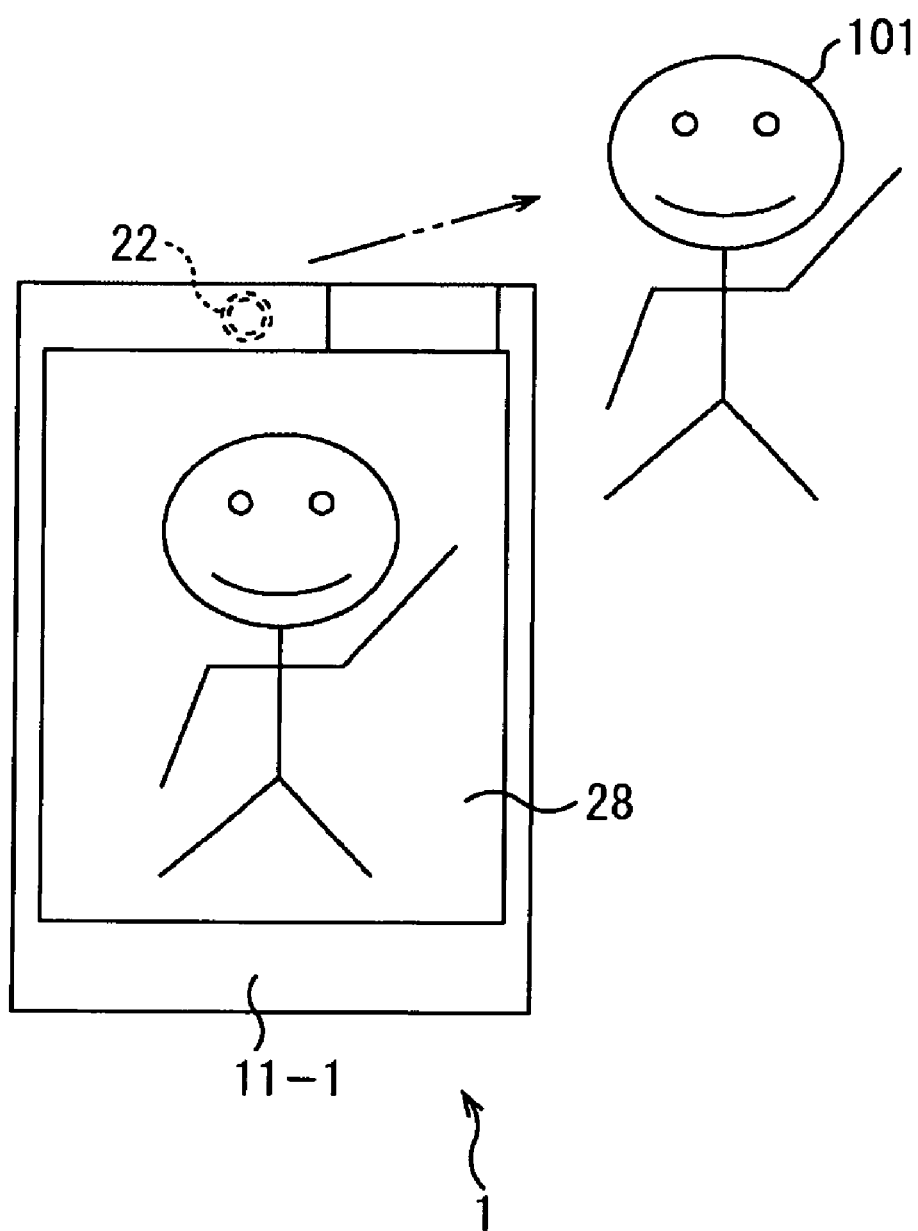
FIG. 6 is a view showing a condition in use of the PDA of FIG. 1.

For example, as shown in FIG. 6, when another person 101 who are on the opposite side of the user of the PDA 1 becomes a photographic subject (when shooting in a direction opposite to the user, viewed from the PDA 1), the user may render the PDA 1 in the state as shown in FIG. 5 (state where the display section 11 is folded over the main body part 13) so that, while turning the LCD 28 to the user, an imaging direction of the camera section 22 may be directed to an opposite side of the user of the PDA 1 (or, in the direction of another person 101 who are photographic subjects). Thus, the user may image the person 101 who is the photographic subject on the opposite side of the PDA 1, while checking the intake image which is taken in from the camera section 22 and displayed on the LCD 28 of the PDA 1.

Figure 7:
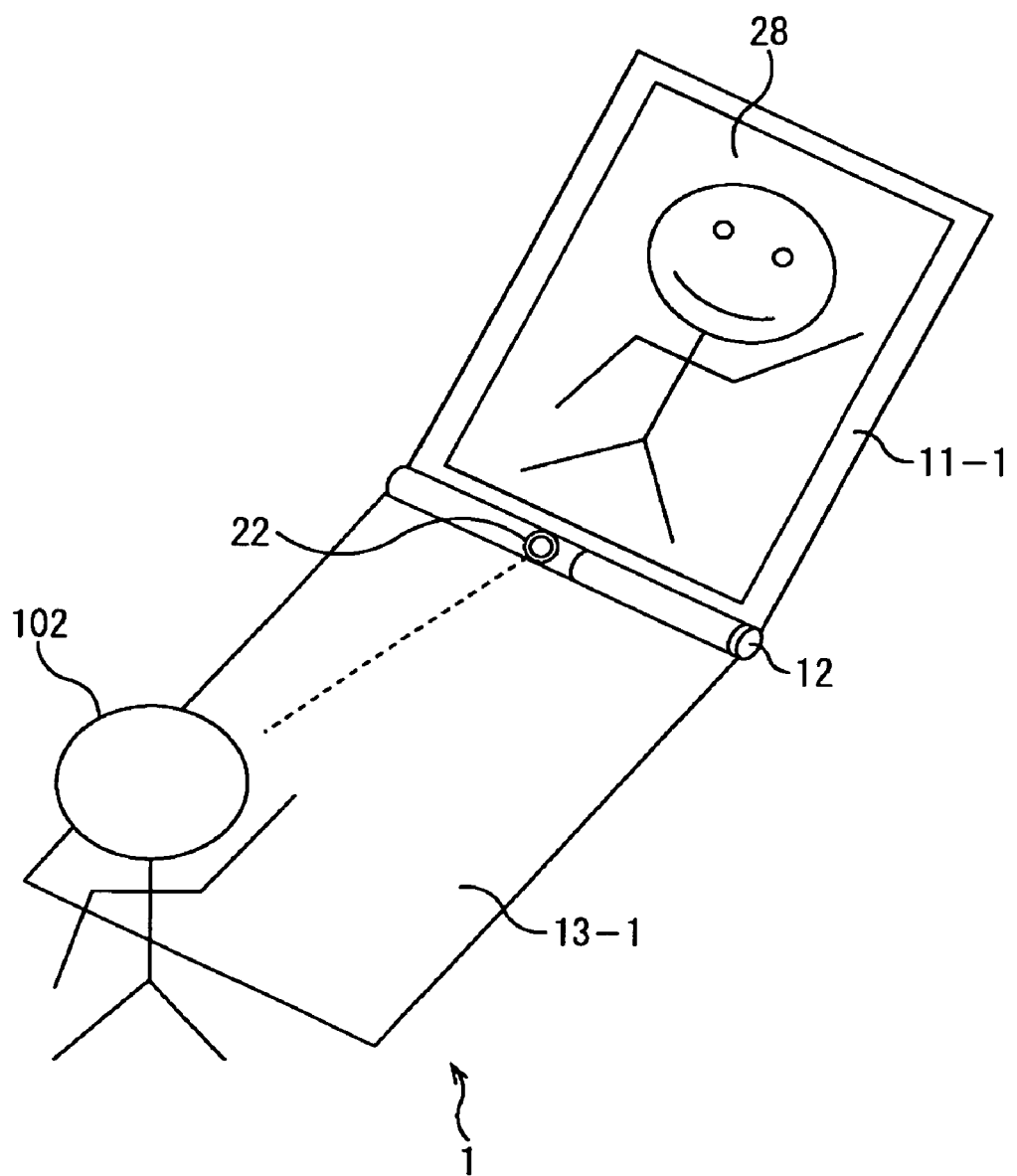
FIG. 7 is a view showing another condition in use of the PDA of FIG. 1.

On the other hand, as shown in FIG. 7, when the user 102 of the PDA 1 considers himself or herself a photographic subject (when shooting towards the user 102, viewed from the PDA 1), the user 102 may render the PDA 1 in the state as shown in FIG. 1 (state where the display section 11 is opened with respect to the main body part 13) so that, while turning the LCD 28 to the user 102, the shooting direction of the camera section 22 may be directed towards the user 102 (or towards the user himself or herself who is the photographic subject). Thus, the user 102 may image himself or herself who is the photographic subject on the same side of the PDA 1, while checking the intake image taken in from the camera section 22 and displayed on the LCD 28 of the PDA 1.

In this way, the user may set up the direction of the camera section 22 with respect to the PDA 1, that is the shooting direction, and carry out the shooting work, while always checking the intake image displayed on the LCD 28 and performing adjustment work by means of the touch panel 36.

Figure 8:
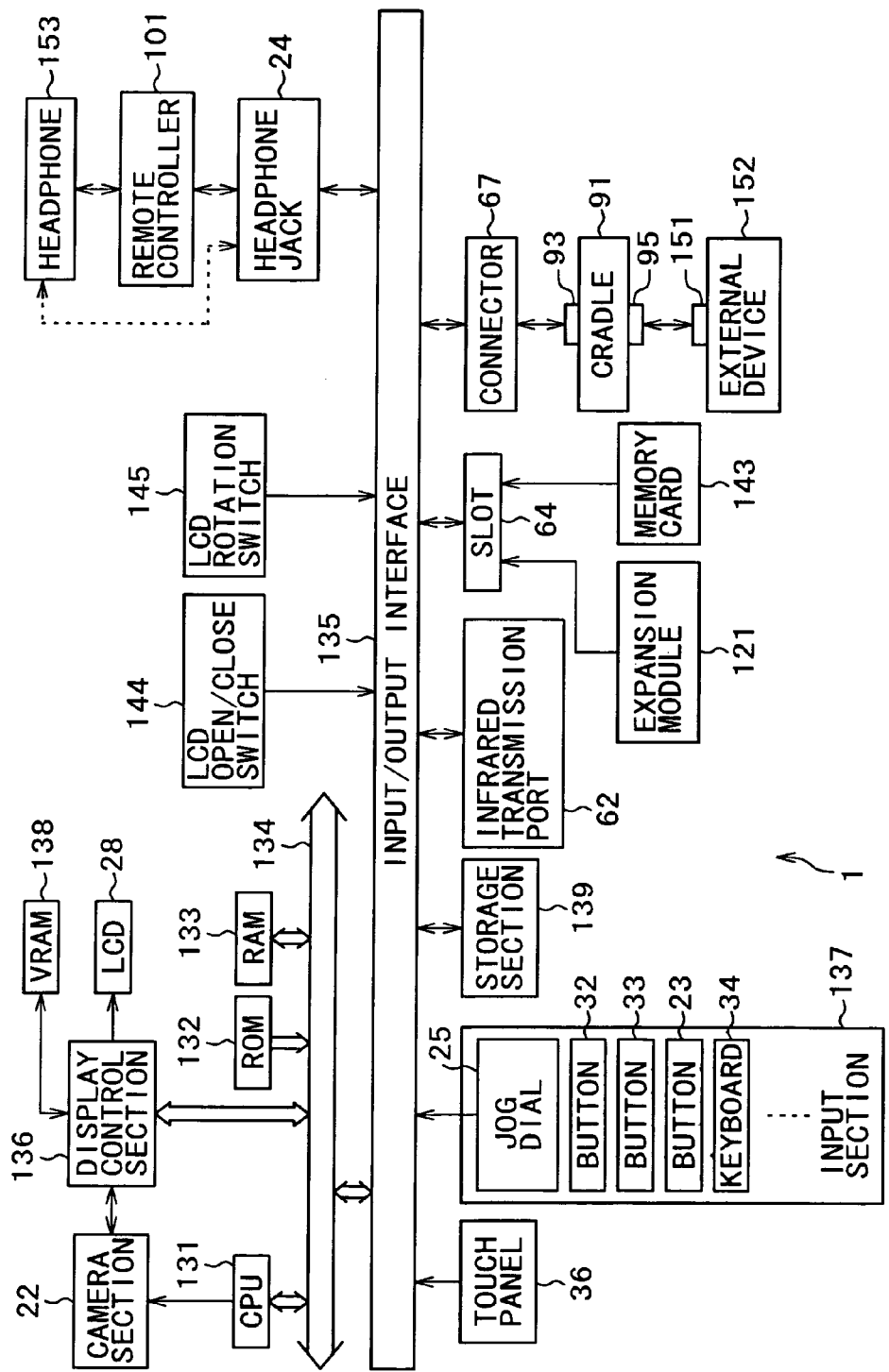
FIG. 8 is a block diagram showing an example of structure inside the PDA of FIG. 1.

FIG. 8 is a block diagram showing an example of structure inside the PDA 1.

A CPU (Central Processing Unit) 131 performs various kinds of processes according to a computer program stored in a ROM (Read Only Memory) 132 or a computer program loaded from the storage section 139 to a RAM (Random Access Memory) 133.

Data required by the CPU 131 when performing various kinds of processes are suitably stored in the RAM 133, for example.

The CPU 131, the ROM 132, and the RAM 133 are mutually connected through a bus 134. A display control section 136, which controls the image displayed on the LCD 28, is also connected to the bus 134.

Based on control of the CPU 131, a VRAM 138, in addition to the camera section 22 and the LCD 28, is connected to the display control section 136. The display control section 136 causes the VRAM 138 to store therein the image captured by the camera section 22, and causes the LCD 28 to display thereon the image stored in the VRAM 138 or the image stored in other memories (the RAM 133, the storage section 139, a memory card 143 connected to slot 64).

An input/output interface 135 is also connected to the bus 134.

Connected to the input/output interface 135 are an input section 137 including the keyboard 34, various buttons 22, 32, and 33, a jog dial 25, etc.; the touch panel 36; the infrared transmission port 62; a slot 64 in which the memory card 143 or an expansion module 121 is mounted; the connector 67 to which the cradle 91 etc. caused to charge a battery (not shown) which is built in the PDA 1 and used as a communications relay device with another external device 152 may be connected; and a headphone jack 24 as an audio outputting section connected with a remote controller 101 or headphones 153.

Further, coordinates detected by the touch panel 36 are provided for the CPU 131 through the input/output interface 135, the bus 134. The CPU 131 obtains predetermined information corresponding to the thus provided coordinates.

For example, as will be described later, during the shooting, if the user does the tap on any position of the intake image displayed on the LCD 28, the touch panel 36 detects the coordinates of the position where the user carried out the tap, and provides the CPU 131 with the coordinates information through the input/output interface 135 and the bus 134. After confirming that it is the position on the intake image according to the provided coordinates information, the CPU 131 controls each part and performs a corresponding process, such as moving an AF frame of a predetermined size to the position.

A storage section 139 including an EEPROM, a hard disk, etc. is connected to the input/output interface 135, as needed. A computer program read from a magnetic disk, an optical disk, a magneto-optical disk, a semiconductor memory, etc. which may be suitably mounted to the external device 152 is supplied to the PDA 1, as needed, by means of wireless communications through the infrared port 62, wireless communications through the wireless LAN module (expansion module) 121, or cable communications through a cradle 91, so as to be installed in the storage section 139. Alternatively, a computer program read from the memory card 143 suitably mounted in the slot 64 may be installed in the storage section 139, as needed.

Further, disposed at the input/output interface 135 are an LCD open/close switch 144 which becomes the ON state when the display section 11 is in a closed state with respect to the main body part 13 and becomes the OFF state when the display section 11 is in an open state with respect to the main body part 13, and an LCD rotation switch 145 which becomes the ON state when the display section 11 is swiveled by more than a predetermined swivel angle.

In other words, in this example, the CPU 131 recognizes the state of opening state and closing with respect to the main body part 13 of the display section 11 (hereafter referred to as an LCD open/close state) and a swivel state, based on the ON state or the OFF state of each of the LCD open/close switch 144 and the LCD rotation switch 145.

Figure 9:
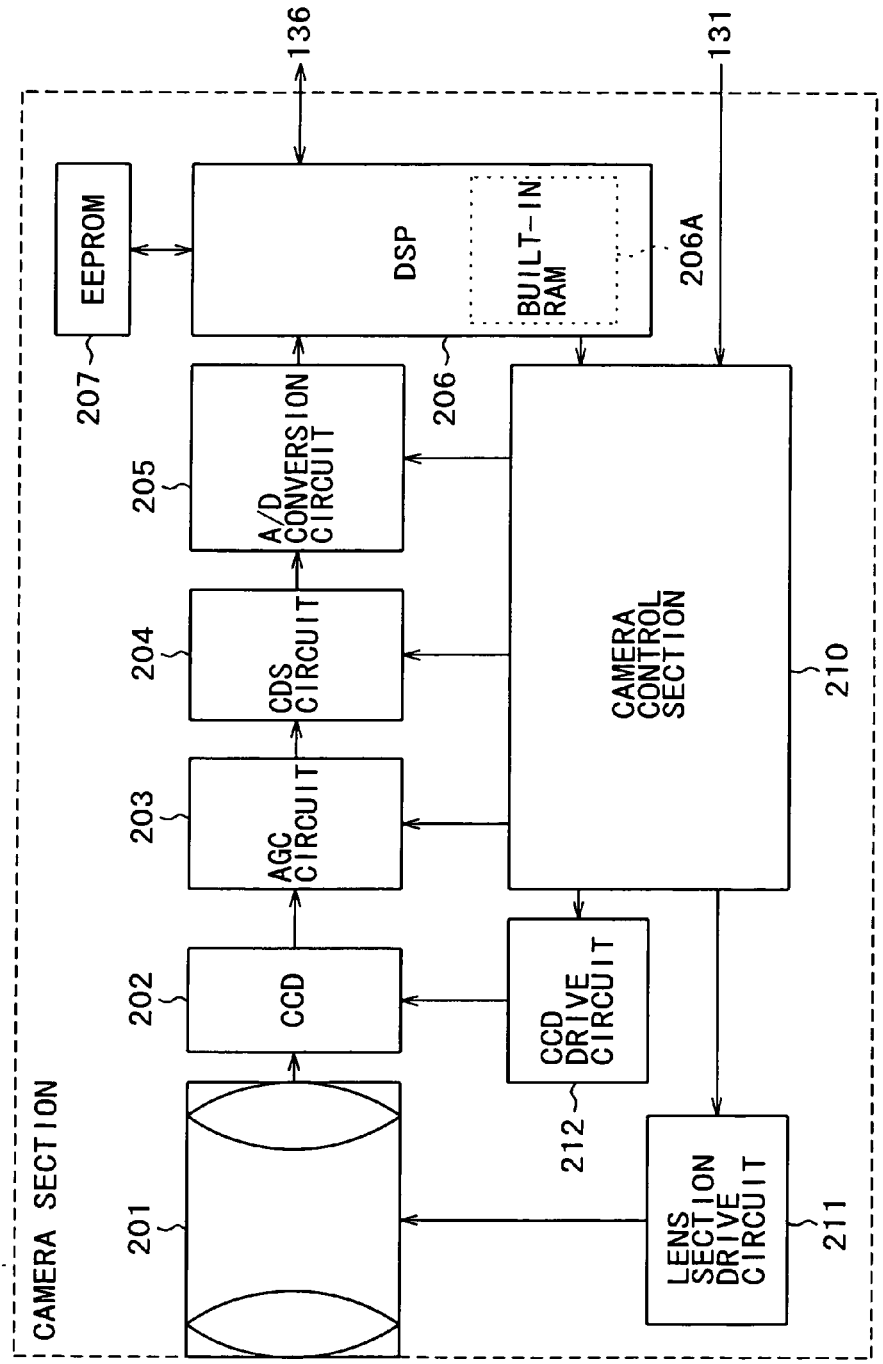
FIG. 9 is a block diagram showing an example of structure inside a camera section of the PDA of FIG. 24.

The camera section 22 is constructed as shown in FIG. 9. A light from a photographic subject (not shown) enters, through a lens section 201, a CCD 202 constituted by the imaging device using CCD (Charge Coupled Device) etc. which is provided with, in front of it, complementary color filters in which yellow color filters (Ye), cyan color filters (Cy), and magenta color filters (Mg), and green color filters (G) are arranged in mosaic-like, so that the light may be converted into electricity.

The CCD 202 outputs the image signal obtained by carrying out the photoelectric conversion in a light intake section so as to be supplied to an AGC (Automatic Gain Control) circuit 203. The AGC circuit 203 adjusts a gain of the image signal, and the image signal whose gain has been thus adjusted is supplied to a CDS circuit (Correlated Double Sampling circuit) 204. After performing correlation double sampling for the inputted image signal and removing a noise, the CDS circuit 204 supplies it to an A/D (Analog/Digital) conversion circuit 205.

The A/D conversion circuit 205 converts an inputted analog signal into a digital signal by a predetermined sampling frequency so as to be supplied to a DSP (Digital Signal Processor) 206 which processes the intake image data.

By using the computer program and data installed in an EEPROM (Electrically Erasable and Programmable Read only Memory) 207, and by means of a built-in RAM 206A constituted by the semiconductor memory, such as SDRAM (Synchronous Dynamic Random Access Memory) to be built in, the DSP 206 holds the supplied image signal so as to generate an image data of a predetermined format, further carries out various kinds of digital processes, such as an image quality adjustment, a compression process, etc. for the generated image data. Then, the DSP 206 supplies the generated image data to the display control section 136 of FIG. 8.

In the case of digital processing of the image data, the DSP 206 supplies information for controlling the lens section 201 through the A/D conversion circuit 205 to a camera control section 210.

Based on the information supplied from the DSP 206 and control information supplied from the CPU 131 of FIG. 8, the camera control section 210 controls a lens position, an aperture, or a mechanical shutter of the lens section 201 via the lens section drive circuit 211, controls an electric operation of the CCD 202 via a CCD drive circuit 212, and also controls the AGC circuit 203, the CDS circuit 204, a timing of the A/D conversion circuit 205 of operation, etc.

The lens section drive circuit 211 is constituted by a motor etc. moves the lens position of the lens section 201 so as to adjust a focal position, based on a control signal supplied from the camera control section 210, or adjusts opening and closing of the aperture or mechanical shutter so as to adjust an exposure value. Based on a timing signal etc. supplied from the camera control section 210, the CCD drive circuit 212 generates a signal for driving the CCD 202 so as to adjust a timing etc. of taking an image in.

For example, based on a control signal supplied from the CPU 131, the camera control section 210 carries out an autofocus process by a TTL (Through The Lens) contrast detection system. When an AF region is specified by the CPU 131, the camera control section 210 detects a contrast of the specified AF region within a shooting frame from a signal of the intake image supplied by the DSP 206, moves a lens of lens 201 via the lens section drive circuit 211, and adjusts the lens position so as to focus on a photographic subject in the region (so that the contrast becomes the highest).

When the user starts a camera application, each of the sections is controlled by the CPU 131, which performed the camera application, and the process moves to a still image shooting mode for imaging a still image using the camera section 22. In this case, the CPU 131 causes the LCD 28 to display a GUI as shown in FIG. 10.

Figure 10:
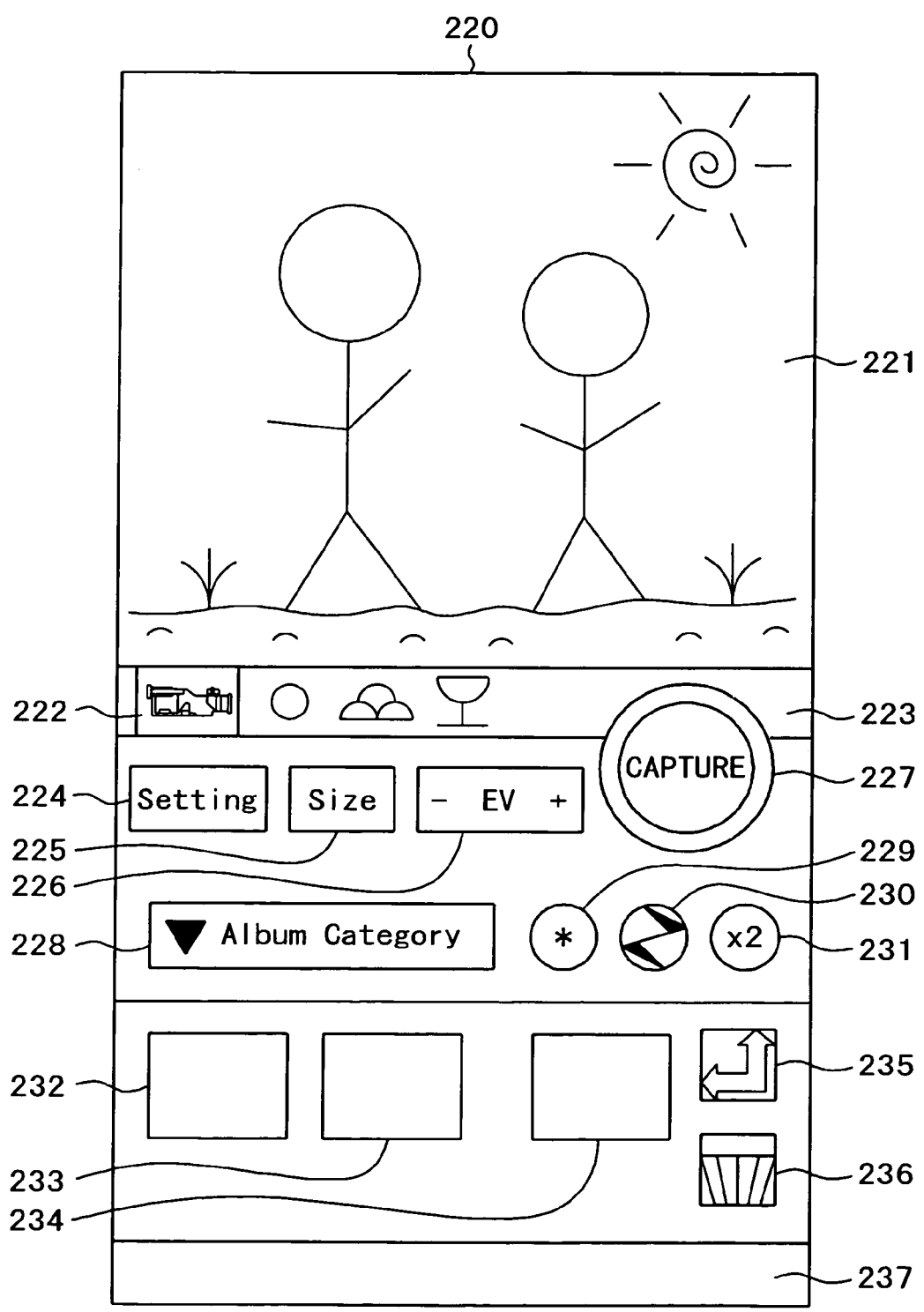
FIG. 10 is a schematic view showing an appearance of a main screen at the time of a still image shooting mode.

In FIG. 10 a main screen 220 is the GUI for receiving various kinds of operations at the time of the still image shooting mode and includes: an EVF area 221 for displaying an intake image and a captured shot image; an application call button 222 for imaging a moving image for starting an application for a moving image shooting mode; an icon area 223 for displaying various kinds of icons; a setup screen call button 224 for displaying a setup screen which is a GUI for performing various kinds of setups; a size and the image quality change button 225 for displaying a GUI relating to the size and the image quality of an image to be imaged; an EV (Exposure Value) compensation slider 226 for adjusting an exposure value of the image to be shot; a software capture button 227 for capturing a still image from the CCD 202; an album category selection box 228 for selecting a folder to be stored with the image data obtained by imaging; a custom button 229 for performing a function set up in the setup screen; a flash mode change button 230 for changing a mode of flashing; a zoom button 231 for adjusting zoom of the captured image; simplified view areas 232 to 234 for displaying a thumbnail image of the image data obtained by imaging; a rotation button 235 for rotating the display of the shot image displayed on the EVF area 221 by 90 degrees for each rotation; a deletion button 236 for deleting the image data obtained by imaging; and a title bar area 237 for displaying various kinds of character data, such as a title of the image data.

FIG. 11 is a view showing a detailed example of a display of the EVF area 221 of FIG. 10. As shown in FIG. 11, a group of icons are superimposed on an intake image in the EVF area 221 so as to display various kinds of information data. A flash mode icon 251 indicates a flash mode currently set up, as needed. A camera-shake warning icon 252 turns a light on for warning if camera-shake occurs during the shooting. A battery icon 253 turns a light on for warning if the residual quantity of a battery is insufficient and the battery needs to be charged. An AF-AE lock indicator 254 turns a light on and blinks the light so as to indicate an AF or AE state. A no-shooting warning icon 255 turns a light on if an available area in the memory for storing shot image data is insufficient, for example, so as to notify that the capture of a new image is not allowed. A shooting situation mode icon 256 turns a light on according to the mode currently set up, among modes relating to shooting processes according to situations, such as a night scene mode, an indoor mode, a distant landscape mode, a close-up imaging mode, etc. A shutter speed icon 257 turns a light on if a manual mode is selected and indicates a shutter speed currently set up.

In addition, a manual focus gauge 258 to be displayed in case a focal length is set up manually and a manual focus gauge pointer 259 which is a pointer for indicating a current focal length are displayed in the EVF area 221 in the case of the manual focusing.

Further, a spot metering pointer 260 for indicating a center of a light metering region at the time of spot metering and an AF frame 261 for indicating a range of the AF region are displayed in the EVF area 221. By means of the mode of AF, the user who is shooting may tap on this EVF area 221 so as to move a position of the AF frame 261 or the spot metering pointer 260.

It should be noted that these icons may be switched between display and non-display mode in accordance with the setup made by the user.

In the above PDA 1, three focus modes are provided as will be described later. In the main screen 220 of FIG. 10, the user activates the setup screen call button 224 (carrying out the tap on the setup screen call button 224 of the LCD 28 etc.) so as to call a setup screen as shown in FIG. 12 and changes over the plurality of focus modes.

FIG. 12 is a view showing an example of structure of a setup screen 301 displayed on the LCD 28. In FIG. 12 the setup screen 301 includes: a setting list display area 302 for showing various kinds of setting items and their current states; a scroll bar 303 for scrolling contents displayed in the setting list display area 302 in order to display an item which cannot be displayed on the setting list display area 302 at a time; a lower scroll button 304 for scrolling items displayed on the setting list display area 302 in the downward direction in the figure; an upper scroll button 305 for scrolling the items displayed on the setting list display area 302 in the upward direction in the figure; a back button 306 for returning a screen displayed on the LCD 28 to the main screen 220; and an EVF area 311 which displays an intake image reflecting the setup in the setup screen 301 and with which the user confirms its effect.

For example, various items relating to the shooting such as a shooting mode, white balance, size/quality, the spot metering, a recording location, a self-timer, the focus mode, etc. are displayed in the setting list display area 302. The user operates the scroll bar 303, the lower scroll button 304, or the upper scroll button 305 or rotates the jog dial 25 etc. so as to display an item desired to set up on the setting list display area 302. Then, by tapping on a portion where the item is displayed or rotating the jog dial 25, for example, an anchor symbol is moved to the item desired to set up.

Then, the user taps on a portion where setup contents on the right-hand side of an item where the anchor is located are displayed, or depresses the jog dial 25 so as to issue instructions to change the item where the anchor is located. For example, in FIG. 12 the anchor is located at the focus mode. On this situation, by tapping on the portion displayed as "Full-time AF" or depressing the jog dial 25, the user may change the setup of the focus mode.

Figure 13:
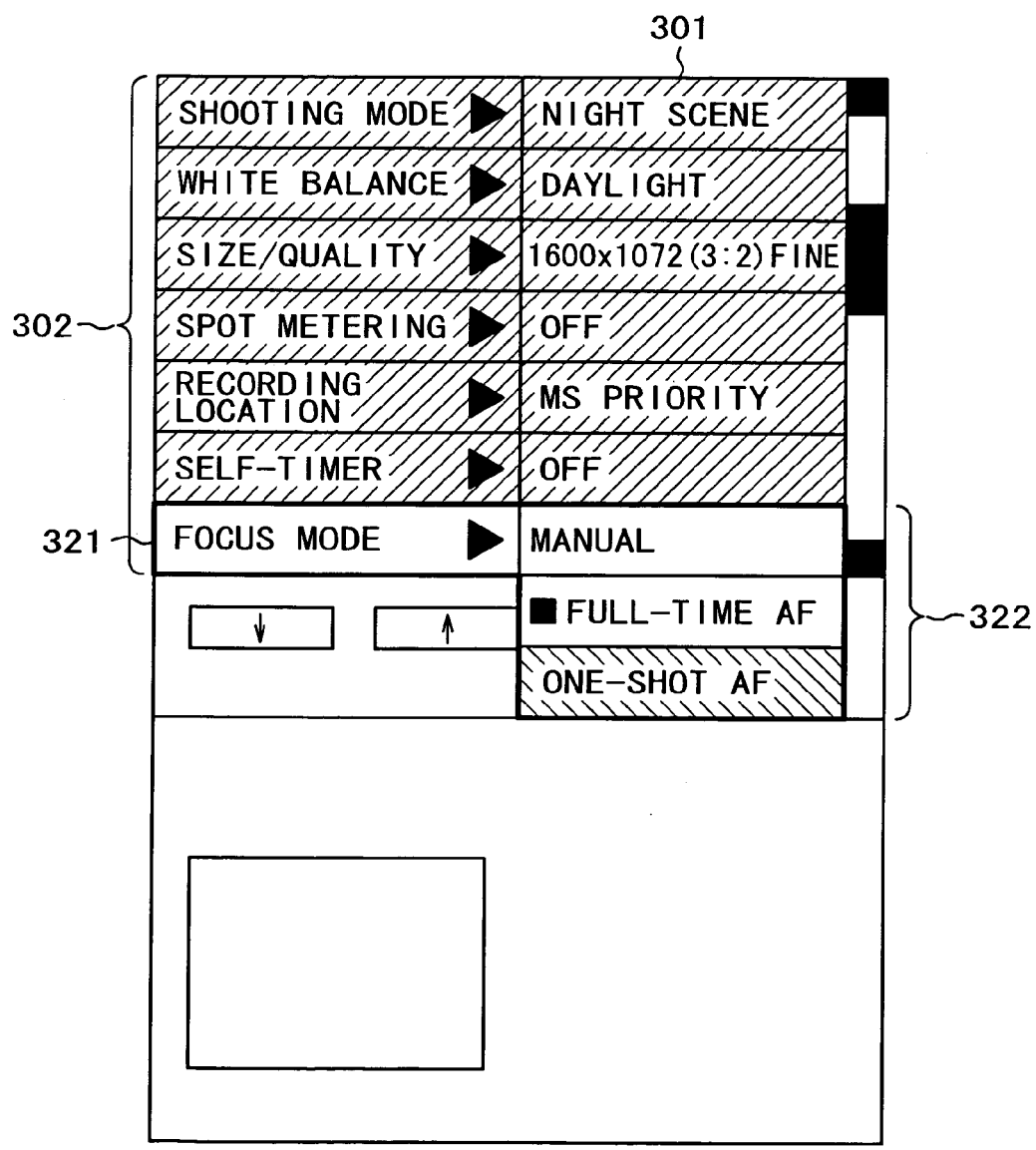
FIG. 13 is a schematic view showing another example of structure of the setup screen.

As shown in FIG. 12 when the user places the anchor in the box indicating the focus mode and specifies it, a setup contents selection screen as shown in FIG. 13 is displayed on the LCD 28 and superimposed on the setup screen 301 as shown in FIG. 12.

In FIG. 13, items in the setting list display area 302 of the setup screen 301 other than the item focus mode selected by the user are darkened. On the right-hand side of an item 321 selected by the user, a setup contents selection screen 322 where a list of corresponding setups is displayed is displayed. In FIG. 13, three modes of "Manual focus", "Full-time AF", and "One shot AF" as setups corresponding to the focus mode are displayed on the setup contents selection screen 322, and a mark is displayed in the box of the currently set up mode ("Full-time AF"in the case of FIG. 13). The anchor is displayed in the box of the currently selected mode ("One shot AF" in the case of FIG. 13) in the setup contents selection screen 322.

As for the list displayed on the setup contents selection screen 322 as shown in FIG. 13, the user sets up a mode by tapping on a portion of the mode to be selected, or rotating the jog dial 25 so as to move the anchor and depress it for specifying the mode to be selected.

Now, each of "Manual focus mode", "Full-time AF mode", and "One shot AF mode" with respect to the focus mode will be described.

The manual focus mode is a mode in which the user sets up a focal length manually. In this case, as shown in FIG. 11, the manual focus gauge 258 and the manual focus gauge pointer 259 are displayed in the EVF area 221. According to the manual focus gauge 258, the user taps once on the portion of a target distance, or rotates the jog dial 25 so as to move the manual focus gauge pointer 259 to a desired position on the manual focus gauge 258 and set up the focal length.

Based on the control signal supplied from the CPU 131 of FIG. 8, the camera control section 210 of FIG. 9 controls the lens position of the lens section 201 through the lens section drive circuit 211 so as to focus on the focal length specified by the user.

When it is desired to return the manual focus gauge pointer 259 to an initial value (the original position before the user moves the manual focus gauge pointer 259), the user does the taps on the LCD 28 two consecutive times during a predetermined short period of time (hereafter referred to as a double-tap). On obtaining information indicating that the user has done the double-tap through the touch panel 36, the CPU 131 controls the display control section 136 and returns the manual focus gauge pointer 259 displayed on the LCD 28 to the initial value.

The full-time AF mode is a mode in which the camera section 22 performs an AF process with respect to the photographic subject in the AF region by means of a TTL contrast detection system. In the full-time AF mode, a position of the AF region is arbitrarily determined by the user within the shooting frame. The AF process is carried out either when the user moves the AF region, or, when the user taps on the software capture button 227 of the main screen 220, or, when the user does the "half depression" on the mechanical capture button 23 of FIG. 1. In addition, as shown in FIG. 14A, in the full-time AF mode, the AF frame 261 indicating the range of the AF region is displayed in the EVF area 221.

In the initial state (state where the user is not moving the position of the AF region), a center of the AF frame 261 is disposed at the center of the EVF area 221. In this case, the AF region as shown in the AF frame 261 is set to 108 dots×60 dots which is comparatively large, while a size of the EVF area 221 is 320 dots×240 dots as shown in FIG. 14A, for example, in order to avoid the so-called "unfocused object", in which the photographic subject shifted from the center of the shooting frame may be away from the AF region.

At this time, if the user activates the software capture button 227 of FIG. 10 or depresses the mechanical capture button 23 (full depression), the camera control section 210 performs an adjusting process such as the AF process by means of the TTL contrast detection system etc., with respect to the AF region surrounded by the AF frame 261, based on the position information on the AF frame 261 supplied from the CPU 131, then carries out the capture process for an image. In addition, when the half depression of the mechanical capture button 23 is carried out, only the adjusting process such as the AF process etc. is performed. Thus, the user may only move the PDA 1 so as to position the photographic subject near the center of the EVF area 221 and activate the software capture button 227 or the mechanical capture button 23, so that an image focused on the photographic subject may be obtained.

Further, the position of this AF frame 261 may be arbitrarily specified by the user, if it is within the EVF area 221. In other words, as shown in FIG. 14B, when the user taps once on the EVF area 221 by means of the touch pen 35 etc., the CPU 131 causes to move the AF frame 261, based on the position information supplied from the touch panel 36, so that the position where the user has tapped may be the center of the AF region.

In this case, the user usually taps on the photographic subject which is desired to be focused, so that it is unlikely that a phenomenon of so-called "unfocused object" will occur. To the contrary, if the AF region is unnecessarily large, it is likely to focus on a photographic subject different from the photographic subject specified by the user in the AF region. Therefore, when the user thus specifies the position of the AF frame 261, the AF region, as shown in FIG. 14B, is set to a range (30 dots×30 dots) smaller than the AF region (108 dots×60 dots) as shown in FIG. 14A (when the user does not specify the position of the AF frame 261).

At this time, based on the position information on the AF frame 261 supplied from the CPU 131, the camera control section 210 carries out the AF process by means of the TTL contrast detection system with respect to the AF region surrounded by the AF frame 261. When the focusing is achieved, the CPU 131 causes to blink the AF frame 261 displayed on the EVF area 221 for a predetermined period of time, in order to notify the user, as shown in FIG. 14C.

When the user activates the software capture button 227 of FIG. 10, depresses (full depression) the mechanical capture button 23, or the like, the camera control section 210 performs the autofocus process by means of the TTL contrast detection system, based on the position information on the AF frame 261 supplied from the CPU 131, with respect to the region surrounded by the AF frame 261, then carries out the capture process of the image. When the "half depression" is carried out by depressing the mechanical capture button 23 by half a stroke, only. the autofocus process is performed. Accordingly, in despite of the photographic subject's location within the EVF area 221, the user may easily obtain the image with the photographic subject being focused.

When it is desired to return the AF frame 261 (the AF region) to the initial state (state as shown in FIG. 14A), the user carries out the double-tap on the EVF area 221. Based on the information supplied from the touch panel 36 and indicating that the user has performed the double-tap, the CPU 131 controls the display control section 136, returns the AF frame 261 displayed on the LCD 28 to the initial state, and controls the camera control section 210 so as to perform the AF process.

It should be noted that, as shown in FIG. 14D, a plurality of grid lines may be provided in a vertical direction and in a lateral direction in the EVF area 221, and coordinates of the center of the AF frame 261 may be located at an intersection of the grid lines. In FIG. 14D and in the EVF area 221, vertical grid lines 331 to 338 as shown in the figure and lateral grid lines 341 to 345 as shown in the figure are provided at predetermined intervals. When the user taps once on the EVF area 221, the CPU 131 obtains, from the touch panel 36, the position information on the position where the user has done the tap, estimates the intersection of the grid lines in the nearest position, moves the AF frame 261 so that the coordinates of the intersection may be in the center of the AF region, and causes the camera control section 210 to perform the AF process.

In this way, since the position of the AF frame 261 can be limited to some extent, the user may move the AF frame 261 to the same position more precisely.

Although, in the example as shown in FIG. 14D, it has been described that eight grid lines in the vertical direction as in the figure and five grid lines in the lateral direction as in the figure are provided in the EVF area 221, any number of grid lines may be disposed in the EVF area 221. The intervals of the respective grid lines may be constant or may vary for respective grid lines. Further, each grid line may not be displayed on the LCD 28.

In the above example, the size of the EVF area 221 is 320 dots×240 dots. The size of the AF region (the AF frame 261) in the initial state is 108 dots×60 dots. The size of the AF region (the AF frame 261) when the user specifies the position of the AF region (the AF frame 261) is described as being 30 dots×30 dots. However, the sizes are not limited to these, and therefore may be any size.

Alternatively, the AF frame 261 indicating the range of AF region may not be normally displayed on the LCD 28 but blink for a predetermined period of time in a set-up position as shown in FIG. 14C for indicating the focusing after performing the AF process.

Further, it has been described the notice of focusing is carried out by blinking the AF frame 261 as shown in FIG. 14C, but is not limited thereto. For example, it may be performed by another indicator such as the AF-AE lock indicator 254 of FIG. 11.

Like the full-time AF mode, the one shot AF mode is a mode where the camera section 22 performs the AF process by means of the TTL contrast detection system with respect to the photographic subject in the AF region. Also in the one shot AF mode, as shown in FIG. 14A, the AF frame 261 indicating the range of the AF region is displayed in the EVF area 221. The position of the AF region (AF frame 261) is arbitrarily determined by the user within the shooting frame.

However, even in the one shot AF mode, the AF process is carried out only when the user moves the AF region. It is not performed when the user taps on the software capture button 227 of the main screen 220 or when the user carries out "half depression" of the mechanical capture button 23 of FIG. 1. In other words, in the one shot AF mode, even if the user activates any of the mechanical capture button 23 and the software capture button 227, the CPU 131 controls each part so that only instructions to perform the capture process may be inputted and instructions to perform the adjusting process, such as AF etc., may not be inputted.

A configuration of the size, the position, etc. and an operation of the AF frame 261, or the control method of the AF frame 261 etc. are similar to those of the full-time AF mode, so that the description will not be repeated.

Conventionally, when an image is shot with a fixed focal length after the AF process (the shooting with so-called "locked focus"), the user performs the AF process by depressing the shutter button halfway and maintains the state of the half depression, from which the user fully depresses the shutter button, when it is a shooting timing, so as to issue instructions to carry out the capture, which needs complicated operations. The one shot AF mode as described above, however, may avoid the AF process immediately before the capture, so that the user may easily carry out the shooting with "locked focus."

Next, a process relating to the shooting in the full-time AF mode will be described in particular.

Figure 15:
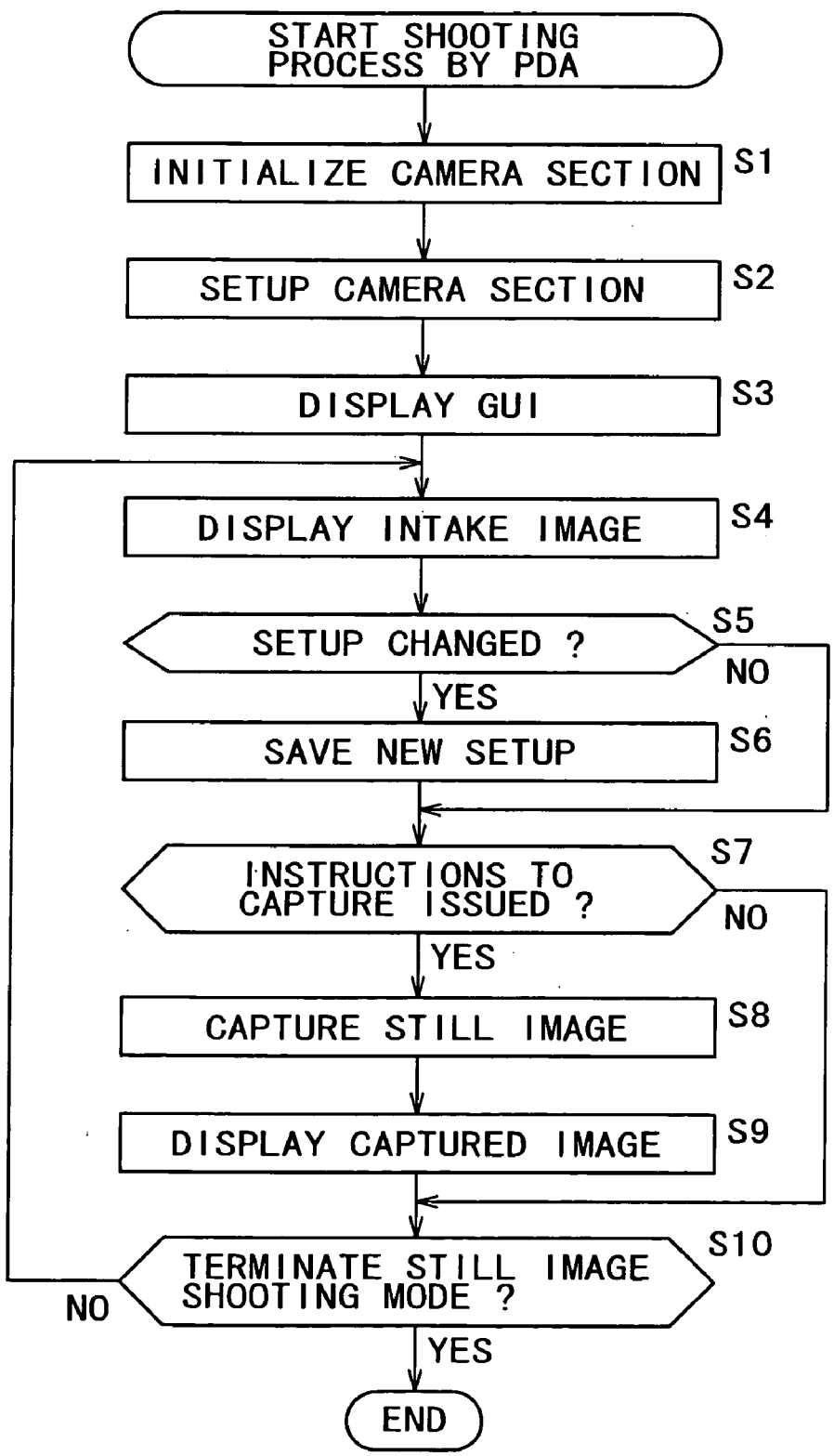
FIG. 15 is a flow chart for explaining an imaging process of the PDA of FIG. 1.

When the user operates the PDA 1 and specifies the still image shooting mode, the PDA 1 moves to the still image shooting mode and starts a shooting process. With reference to a flow chart of FIG. 15, the shooting process will be described.

At first, the CPU 131 of the PDA 1 controls the camera control section 210 of the camera section 22 so as to start the camera section 22 and carry out an initialization process of the camera section 22. In step S2, the setup information about the camera section 22 stored in the RAM 133, the storage section 139, etc. is read, and the read setup information is supplied to the camera control section 210 of the camera section 22 so as to carry out the setup process of the camera section 22. In addition, in step S3, the CPU 131 controls the display control section 136 so as to display, on the LCD 28, the GUI for still image shooting mode like the main screen 220 as shown in FIG. 10.

In step S4, the DSP 206 of the camera section 22, supplies the display control section 136 with data of the intake image taken in the CCD 202 and entered through the lens section 201. The display control section 136 causes the LCD 28 to display the intake image.

In step S5, the CPU 131 controls the touch panel 36 and each button of the input section 137 so as to determine whether or not the user has inputted a new input about a setup and the latest setup has been changed. When it is determined that the setup has been changed, the CPU 131 saves a new setup in the RAM 133, the storage section 139, etc., and the process goes to step S7.

In step S5, when it is determined that the setup has not been changed, the CPU 131 skips the process of step S6 and causes the process to go to step S7.

In step S7, the CPU 131 monitors the touch panel 36 and the input section 137, and determines whether or not the user has issued instructions to capture the still image. When it is determined that the instructions have been issued, the CPU 131 orders the camera control section 210 of the camera section 22 to capture the image picture. Based on the order, the camera control section 210 controls each part of the camera section 22 so as to capture the still image.

Then, the DSP 206 carries out image processing with respect to the image data of the captured image so as to be supplied to the display control section 136. In step S9, the display control section 136 combines the captured image with the EVF area 221 of the GUI so as to be displayed on the LCD 28. When the captured image is displayed, the CPU 131 causes the process to go to step S10.

In step S7, when it is determined that the instructions to carry out the capture have not been issued, the CPU 131 skips the processes of steps S8 and S9 and causes the process to go to step S10.

In step S10, the CPU 131 determines whether or not to terminate the still image shooting mode. When it is determined to terminate it, the imaging process is terminated.

When it is determined not to terminate the still image shooting mode, the CPU 131 returns the process to step S4 and the processes thereafter are repeated.

As described above, the PDA 1 carries out the shooting process in the still image shooting mode.

Figure 16:
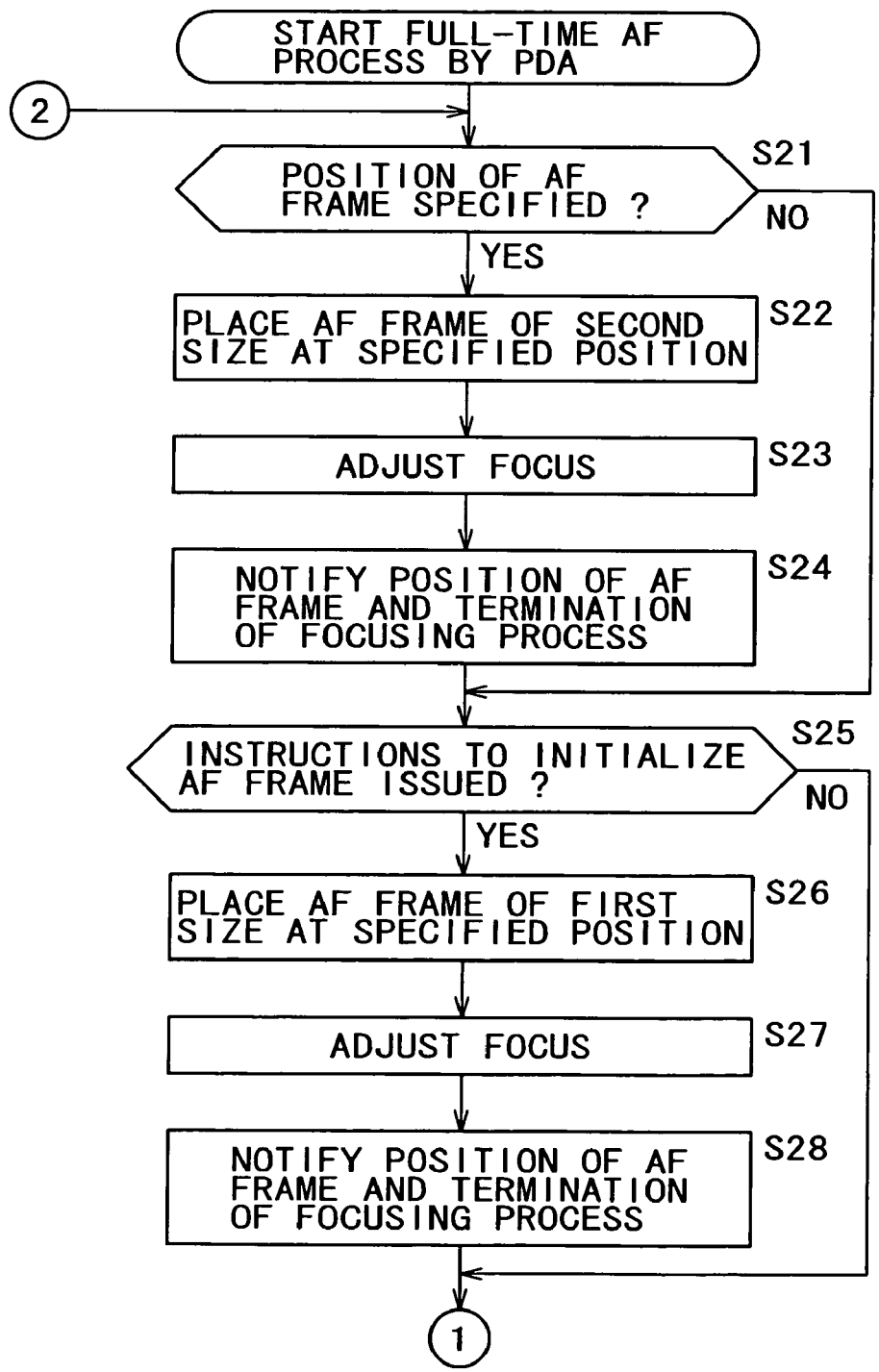
FIG. 16 is a flow chart for explaining a full-time AF process of the PDA of FIG. 1.

Now, with reference to flow charts of FIG. 16 and FIG. 17, a full-time AF process which is the AF process in the full-time AF mode will be described. As described above with reference to FIG. 14A, in the initial state (state where the user does not specify the position of the AF frame 261) in the full-time AF mode, the AF frame 261 of a first size indicating the range of a larger AF region is provided in the EVF area 221 so that its center is located at the center of the EVF area 221.

In step S21, the CPU 131 controls the touch panel 36 and determines whether or not the position of the AF frame 261 has been specified by the user, as shown in FIG. 14B. If the user taps on the EVF area 221 of the LCD 28 once, the touch panel 36 detects it and supplies its position information to the CPU 131.

When the position information on the position where the tap has been carried out is supplied from the touch panel 36 and it is determined that the position of the AF frame 261 has been specified, the CPU 131 causes the process to go to step S22 and places the AF frame of the second size smaller than the first size in a specified position, based on the supplied position information.

Then, in step S23, the CPU 131 supplies the position information on the AF frame 261 to the camera control section 210 of the camera section 22. Based on the position information, the camera control section 210 adjusts a focus with respect to the AF region surrounded by the placed AF frame 261 by means of the TTL contrast detection system.

When the focusing is achieved by the focus adjusting process, the CPU 131 causes the process to go to step S24, controls the position of the AF frame and the display control section 136 so as to notify the termination of the focusing process and blink the AF frame 261 displayed on the LCD 28 for a predetermined period of time. Upon completion of the blink, the CPU 131 causes the process to go to step S25.

In step S21, when the position information has not been supplied from the touch panel 36 and it is determined that the position of the AF frame 261 has not been specified, the CPU 131 skips the processes in step S22 to S24, and causes the process to go to step S25.

In step S25, the touch panel 36 is controlled and it is determined whether or not instructions to initialize the AF frame 261 have been issued by the user. If the user does the double-tap on the EVF area 221 of the LCD 28, the touch panel 36 detects it and supplies the information to the CPU 131.

When the information on the double-tap has been supplied from the touch panel 36 and it is determined that the instructions to initialize the AF frame 261 have been issued, the CPU 131 causes the process to go to step S26 and places the AF frame of the first size in the initial position. In other words, the CPU 131 places the AF frame 261 in the position where the center of AF region is located at the center of the EVF area 221.

In step S27, the CPU 131 supplies the position information on the AF frame 261 to the camera control section 210 of the camera section 22. Based on the position information, the camera control section 210 adjusts the focus with respect to the AF region surrounded by the placed AF frame 261 by means of the TTL contrast detection system.

When the focusing is achieved by the focus adjusting process, the CPU 131 causes the process to go to step S28 and controls the position of the AF frame and the display control section 136 so as to notify the termination of the focusing process and blink the AF frame 261 displayed on the LCD 28 for the predetermined period of time. After completion of the blink, the CPU 131 causes the process to go to step S29 of FIG. 17.

Figure 17:
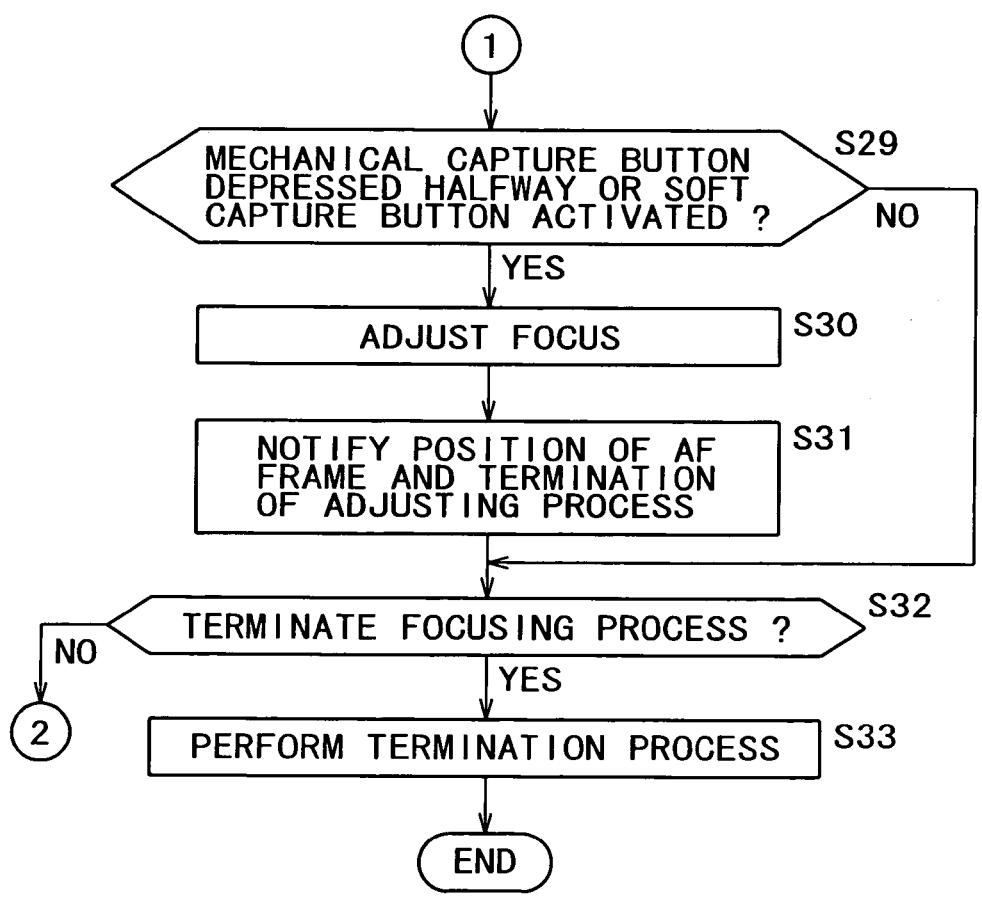
FIG. 17 is a flow chart following FIG. 16 for explaining the full-time AF process of the PDA of FIG. 1.

In step S25, when it is determined that the instructions to initialize the AF frame 261 have not been issued by the user, the CPU 131 skips the processes of steps S26 to S28 and causes the process to go to step S29 of FIG. 17.

In step S29, the CPU 131 monitors the touch panel 36 and the input section 137 and determines whether the mechanical capture button 23 has been depressed halfway or the software capture button 227 on the main screen 220 has been activated by the user.

When it is determined that the mechanical capture button 23 has been depressed halfway or the software capture button 227 on the main screen 220 has been activated, the CPU 131, in step S30, adjusts the focus with respect to the AF region surrounded by the AF frame 261 by means of the TTL contrast detection system.

When the focusing is achieved by the focus adjusting process, the CPU 131 causes the process to go to step S31 and controls the position of the AF frame and the display control section 136 so as to notify the termination of the focusing process and blink the AF frame 261 displayed on the LCD 28 for the predetermined period of time. Upon completion of the blink, the CPU 131 causes the process to go to step S32.

In step S29, when the mechanical capture button 23 has not been depressed halfway and it is determined that the software capture button 227 on the main screen 220 has not been activated, the CPU 131 skips the processes of steps S30 and S31 and causes the process to go to step S32.

In step S32, based on the instructions of the user etc., the CPU 131 determines whether to end the focusing process or not. When it is determined not to end it, the CPU 131 returns the process to step S21 of FIG. 16, and the processes thereafter are repeated.

In step S32, when it is determined to end the focusing process, the CPU 131 carries out the termination process in step S33, then ends the full-time AF process.

According to the full-time AF mode as described above, as for any image composition, the user may easily obtain the still image having been processed with more. suitable AF.

Figure 18:
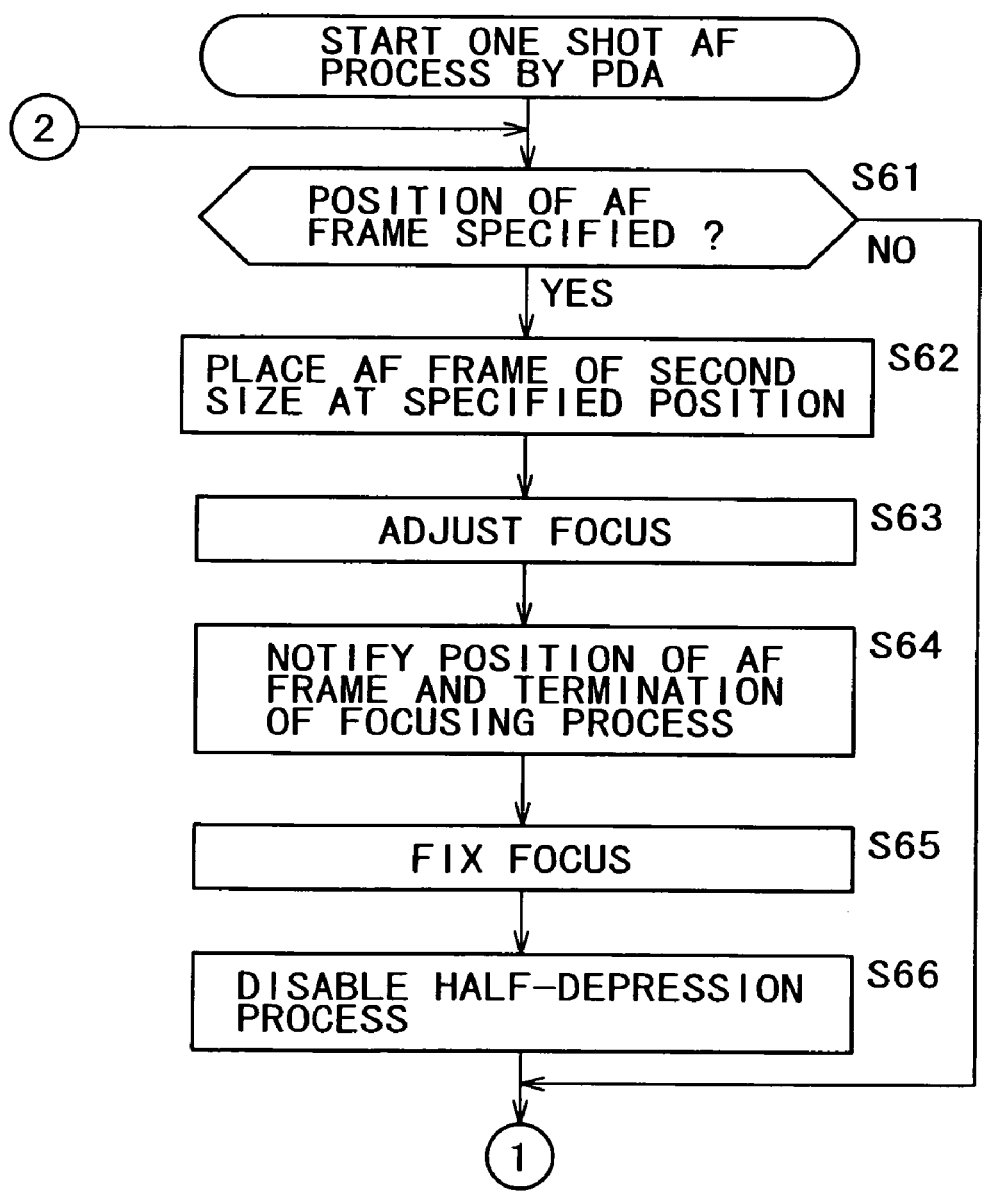
FIG. 18 is a flow chart for explaining a one shot AF process of the PDA of FIG. 1.

Next, with reference to flow charts of FIG. 18 and FIG. 19, a one shot AF process which is the AF process in the one shot AF mode is described. As described above, in the initial state (state where the user does not specify the position of the AF frame 261) in the one shot AF mode, as with the case where the full-time AF mode, as shown in FIG. 14A, the AF frame 261 of the first size indicating the range of the larger AF region is provided in the EVF area 221 so that its center is located at the center of the EVF area 221.

In step S61, the CPU 131 controls the touch panel 36 and determines whether or not the position of the AF frame 261 has been specified by the user as shown in FIG. 14B. If the user taps on the EVF area 221 of the LCD 28 once, the touch pane 136 detects it and supplies its position information to the CPU 131.

When the position information on the position where the tap has been carried out is supplied from the touch panel 36 and it is determined that the position of the AF frame 261 has been specified, the CPU 131 causes the process to go to step S62 and places the AF frame of the second size smaller than the first size in the specified position, based on the supplied position information.

In step S63, the CPU 131 supplies the position information on the AF frame 261 to the camera control section 210 of the camera section 22. Based on the position information, the camera control section 210 adjusts the focus with respect to the AF region surrounded by the placed AF frame 261 by means of the TTL contrast detection system.

When the focusing is achieved by the focus adjusting process, the CPU 131 causes the process to go to step S64 and controls the position of the AF frame and the display control section 136 so as to notify the termination of the focusing process and blink the AF frame 261 displayed on the LCD 28 for the predetermined period of time.

In step S65, at the time of focusing, the CPU 131 controls the camera control section 210 so as to fix the lens position of the lens section 201. In step S66, it disables the half depression process which is performed by operating the mechanical capture button 23 or the software capture button 227.

In other words, the CPU 131 prohibits the focus adjusting process even if the user does the half depression operation on the mechanical capture button 23. When the user does the full depression operation on the mechanical capture button 23, and when the user activates the software capture button 227, it does not allow the focus adjusting process but capturing the still image only.

After disabling the half depression process, the CPU 131 causes the process to go to step S67 of FIG. 19.

In step S61 of FIG. 18, when the position information has not been supplied from the touch panel 36 and it is determined that the position of the AF frame 261 has not been specified, the CPU 131 skips the processes of steps S62 to S66 and causes the process to go to step S67 of FIG. 19.

In step S67 of FIG. 19, the CPU 131 controls the touch panel 36 and determines whether or not the user has issued instructions to initialize the AF frame 261. If the user does the double-tap on the EVF area 221 of the LCD 28, the touch panel 36 detects it and supplies its information to the CPU 131.

When the information on the double-tap has been supplied from the touch panel 36 and it is determined that the instructions to initialize the AF frame 261 have been issued, the CPU 131 causes the process to go to step S68 and places the AF frame of the first size in the initial position. In other words, the CPU 131 places the AF frame 261 in the position where the center of the AF region meets the center of the EVF area 221.

In step S69, the camera control section 210 adjusts the focus with respect to the AF region surrounded by the disposed AF frame 261 by means of the TTL contrast detection system.

When the focusing is achieved by the focus adjusting process, the CPU 131 causes the process to go to step S70 and controls the position of the AF frame and the display control section 136 so as to notify the termination of the focusing process and blink the AF frame 261 displayed on the LCD 28 for the predetermined period of time.

As with the cases of steps S65 and S66, the CPU 131, in step S71 at the time of focusing, controls the camera control section 210 so as to fix the lens position of the lens section 201. In step S72, it disables the half depression process which is performed by operating the mechanical capture button 23 or the software capture button 227. Then, the CPU 131 causes the process to go to step S73.

In step S67, when it is determined that the user has not issued the instructions to initialize the AF frame 261, the CPU 131 skips the processes of steps S68 to S72 and causes the process to go to step S73.

In step S73, based on the user's instructions etc., the CPU 131 determines whether or not the focusing process is ended.

When it is determined not to end it, the CPU 131 returns the process to step S61 of FIG. 18 and the processes thereafter are repeated.

In step S73, when it is determined to end the focusing process, the CPU 131 performs the termination process in step S74 then terminates the one shot AF process.

According to the one shot AF mode, the user may easily obtain the still image having been processed with more suitable AF when shooting with the so-called "locked focus."

Although the AF process has been described above, at the time of an exposure adjustment (the AE process) and in the case of the spot metering which performs an exposure metering process with respect to a small region, not only the center of the shooting frame but also the position of the AF region may be specified by the user, for example.

In the setup screen 301 as shown in FIG. 12, when the user places the anchor in the box indicating the spot metering and specifies it, which is superimposed on the setup screen 301 as shown in FIG. 12 so that the setup contents selection screen as shown in FIG. 20 is displayed on the LCD 28.

In FIG. 20, the items in the setting list display area 302 of the setup screen 301 other than the item, the spot metering, selected by the user are darkened. On the right-hand side of an item 351 selected by the user, a setup contents selection screen 352 where a list of corresponding setups is displayed is displayed. As a setup corresponding to the spot metering, two modes of "OFF" and "ON" are displayed. The mark is displayed in the box of "OFF" which is currently set up, and the anchor is displayed in the box of "ON" which is currently chosen.

Selecting from the list displayed on the setup contents selection screen 352 as shown in FIG. 20, the user may carry out the tap on the portion of "ON" or rotate the jog dial 25 so as to move and depress the anchor, to thereby specify the spot metering mode.

Figure 21B:
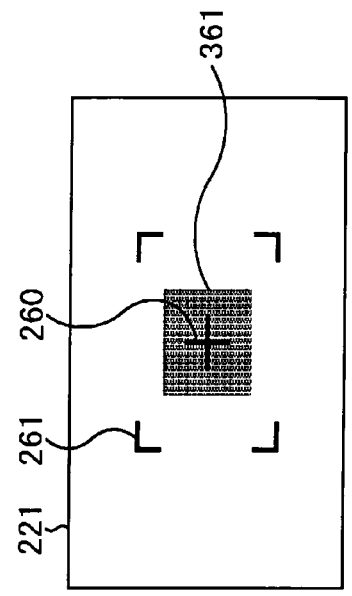
FIGS. 21A to 21D are schematic views showing examples of display of a spot metering pointer.
Figure 21D:
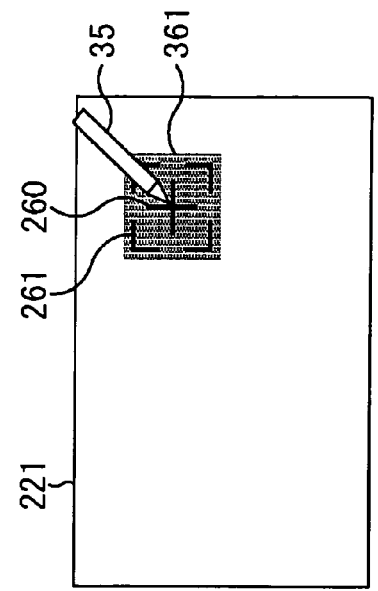
Figure 21A:
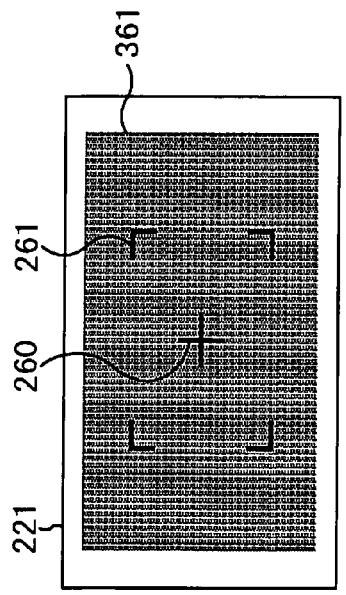

As shown in FIG. 21A, a normal AE process is carried out for the AE region 361 of the EVF area 221 (shooting frame) which is substantially the whole region. In FIG. 20, when the user sets up the spot metering mode, the AE region 361, as shown in FIG. 21B, is smaller than that in the case of FIG. 21A. The AE process which shows the center of the AE region is carried out for this small AE region 361.

At the time of the spot metering mode, the spot metering pointer 260 indicating the center of the AE region 361 is displayed in the EVF area 221.

In the case of its initial state (when the user does not specify the position of the AE region 361) the AE region 361 is disposed so that its center may be located at the center of the EVF area 221 (shooting frame).

At this time, if the user activates the software capture button 227 of FIG. 10, or depresses (full depression) the mechanical capture button 23, the camera control section 210 performs the adjusting process, such as the AE process etc., with respect to this AE region, then carries out the capture process of the image. In addition, when the mechanical capture button 23 is depressed halfway, only the adjusting process, such as the AE process etc. is performed. Further, upon completion of the AE process, the spot metering pointer 260 may be blinked, or a predetermined confirmation sound may be presented.

Thus, the user may only operate the software capture button 227 or the mechanical capture button 23 so as to obtain the image where the light exposure has been adjusted only near the center of the shooting frame (for example, an image treated to obtain effects such as highlighting a photographic subject in the center).

Figure 21C:
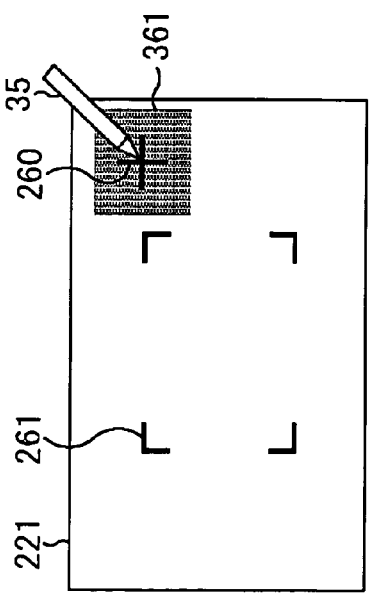

The position of the AE frame 361 may be arbitrarily specified by the user, if it is within the EVF area 221. In other words, as shown in FIG. 21C, when the user taps on the EVF area 221 once by using the touch pen 35 etc., based on the position information supplied from the touch panel 36, the CPU 131 moves the spot metering pointer 260 so that the position where the user has tapped may be in center of the AE region 361 and causes the camera section 22 to perform the AE process for the AE region 361.

When it is desired to return the AE region 361 to the initial state (state as shown in FIG. 21A), the user carries out the double-tap on the EVF area 221. Based on the information, supplied from the touch panel 36, indicating that the user has performed the double-tap, the CPU 131 initializes the AE region, controls the display control section 136 to return the spot metering pointer 260 displayed on the LCD 28 to the initial state, and controls and causes the camera control section 210 to perform the AE process.

In addition, as shown in FIG. 21D, in the full-time AF mode or the one shot AF mode as described above, when the user moves the AF frame 261, the AE region 361 may be similarly moved so that the spot metering pointer 260 is located at the center of the AF region.

Further, as with the case of FIG. 14D, a plurality of grid lines (not shown) are disposed at predetermined intervals in the EVF area 221. When the user taps on the EVF area 221 once, the CPU 131 may obtain, from the touch panel 36, position information on the position where the user has done the tap, estimate an intersection of the grid lines in the nearest position, move the spot metering pointer 260 so that the coordinates of the intersection may be in the center of the AE region 361, and cause the camera control section 210 to perform the AE process.

In the above example, any dimensions of the range of the AE region 361 may be acceptable if the dimensions of the normal AE region 361 are larger than those in the case of the spot metering. The AE region 361 and the spot metering pointer 260 may be or may not be displayed in the EVF area 221.

Next, the AE process in the spot metering mode will be particularly described. In the setup screen 301 of FIG. 20, when the user chooses "ON" in the spot metering item 351, it shifts to spot metering mode, and the AE region changes from the state of FIG. 21A to the state of FIG. 21B. Then, the PDA 1 starts a spot AE process.

Figure 22:
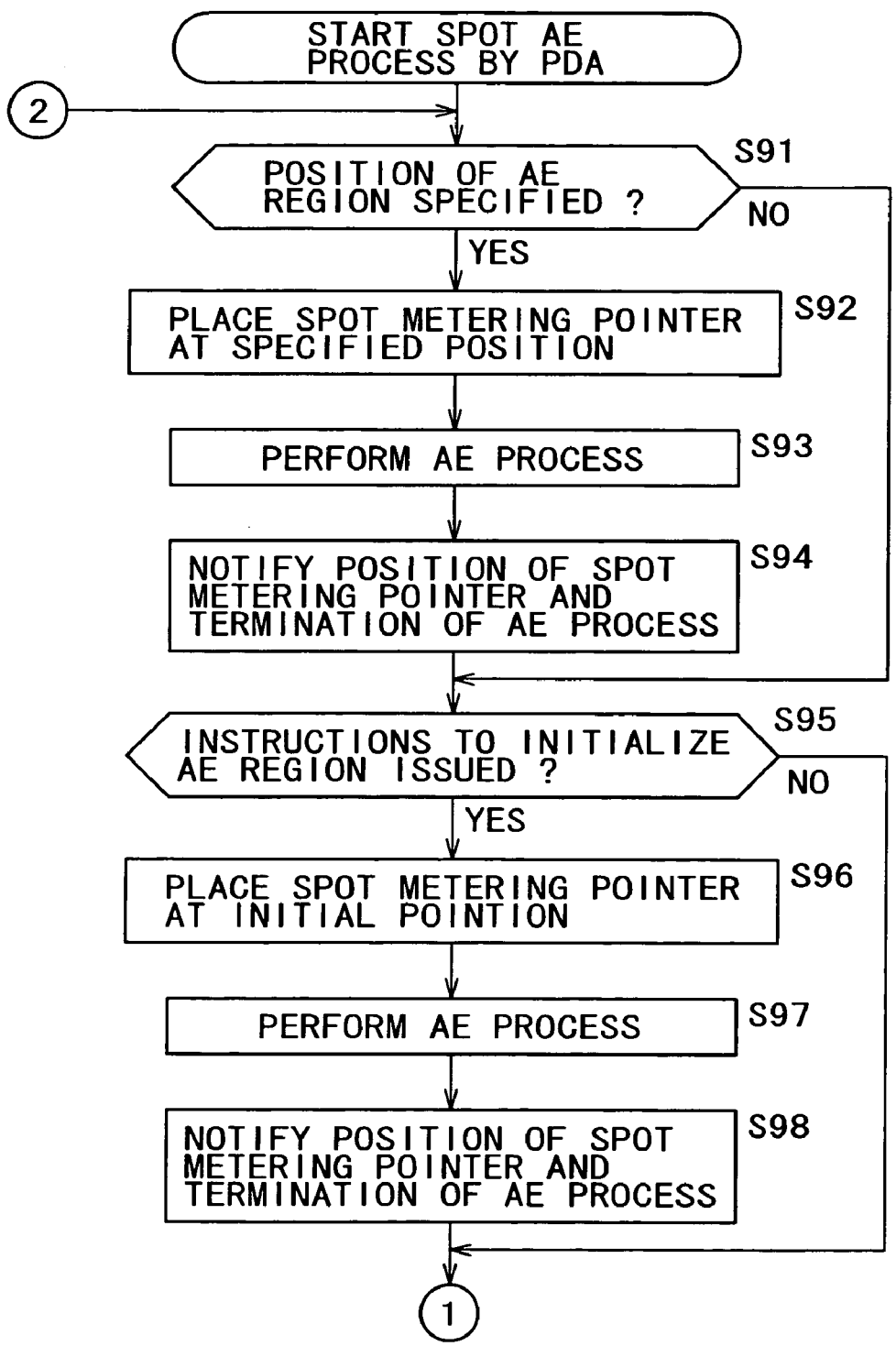
FIG. 22 is a flow chart for explaining a spot AE process of the PDA of FIG. 1.

With reference to flow charts of FIG. 22 and FIG. 23, the spot AE process in the spot metering mode will be described. As described above referring to FIG. 21B, in the initial state in the spot metering mode (state where the user does not specify the position of the AE region 361) the AE region of a small range is set up, in the EVF area 221, so that its center is located at the center of the EVF area 221 and the spot metering pointer 260 is displayed at the center of the EVF area 221.

In step S91, the CPU 131 controls the touch panel 36 and determines whether or not the position of the AE region has been specified by the user, as shown in FIG. 21C. If the user taps on the EVF area 221 of the LCD 28 once, the touch panel 36 detects it and supplies its position information to the CPU 131.

The position information on the position where the tap has been carried out is supplied from the touch panel 36, and when it is determined that the position of the AE region 361 has been specified, the CPU 131 causes the process to go to step S92, places the spot metering pointer 260 in the specified position, based on the supplied position information. In other words, the CPU 131 sets up the AE region 361 so that the position specified by the user may be in the center.

In step S93, based on the position information on the AE region supplied from the CPU 131, the camera control section 210 adjusts an exposure for the set-up AE region 361, and carries out the AE process.

Upon completion of the AE process, the CPU 131 causes the process to go to step S94, controls the display control section 136 so as to notify the position of the spot metering pointer 260 and the termination of the AE process and blink the spot metering pointer 260 displayed on the LCD 28 for a predetermined period of time. After completing the blink, the CPU 131 causes the process to go to step S95.

In step S91, when the position information has not been supplied from the touch panel 36 and it is determined that the position of the AE region 361 has not been specified, the CPU 131 skips processes of steps S92 to S94, and causes the process to go to step S95.

In step S95, the touch panel 36 is controlled and it is determined whether or not the instructions to initialize the AE region 361 have been issued by the user. When the user does the double-tap on the EVF area 221 of the LCD 28, the touch panel 36 detects it and supplies its information to the CPU 131.

When the information on the double-tap is supplied from the touch panel 36 and it is determined that the instructions to initialize the AE region 361 have been issued, the CPU 131 causes the process to go to step S96 and places the spot metering pointer 260 in the initial position. In other words, the CPU 131 places the spot metering pointer 260 in the position so that the center of the AE region may meet the center of the EVF area 221.

In step S97, based on the position information about the AE region 361 supplied to the CPU 131, the camera control section 210 adjusts the exposure for the set-up AE region 361 so as to carry out the AE process.

Upon completion of the AE process, the CPU 131 causes the process to go to step S98 and controls the display control section 136 so as to notify the position of the spot metering pointer and the termination of the AE process and blink the spot metering pointer 260 displayed on the LCD 28 for the predetermined period of time. After completing the blink, the CPU 131 causes the process to go to step S99 of FIG. 23.

Figure 23:
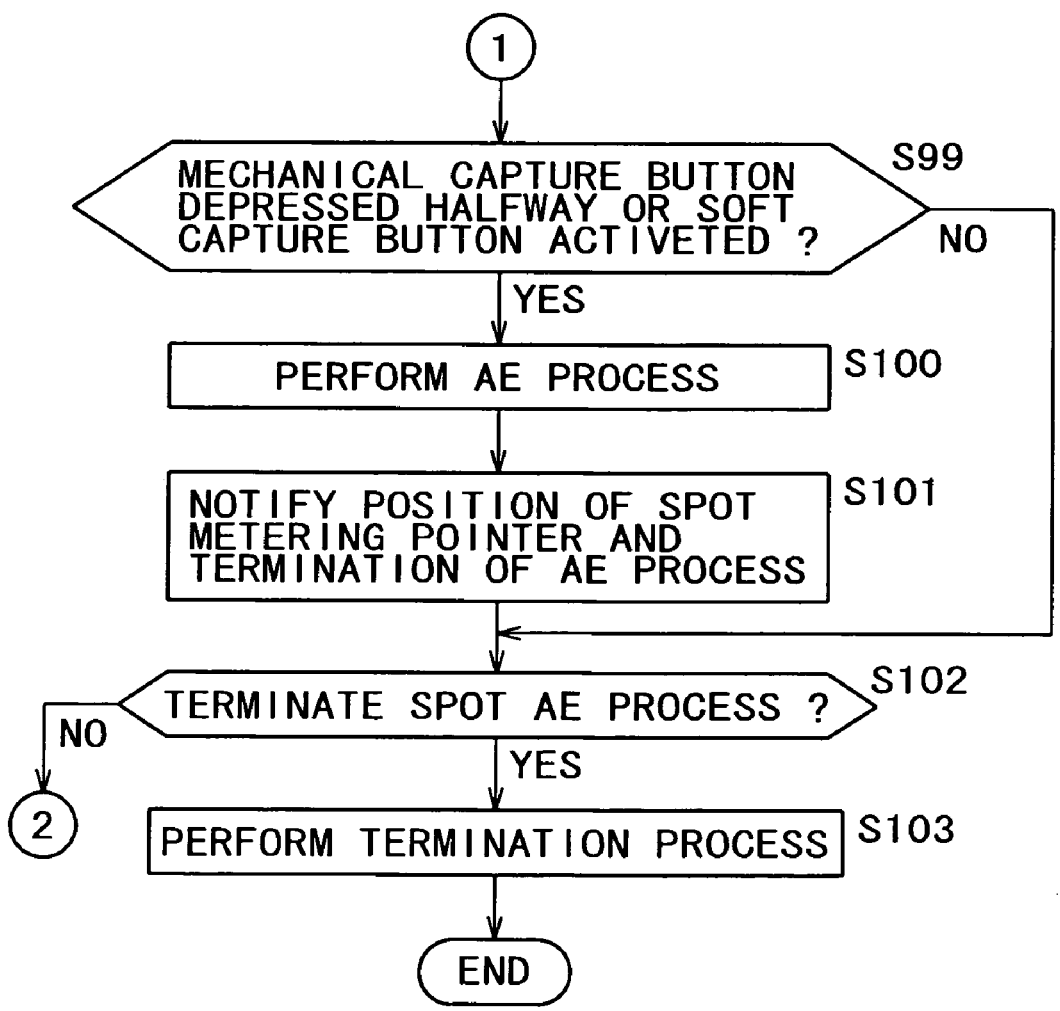
FIG. 23 is a flow chart following FIG. 22 for explaining the spot AE process of the PDA of FIG. 1.

In step S95, when it is determined that the instructions to initialize the AE region 361 have not been issued by the user, the CPU 131 skips processes of step S96 to S98 and causes the process to go to step S99 of FIG. 23.

In step S99 of FIG. 23, the CPU 131 monitors the touch panel 36 and the input section 137 so as to determine whether the user has half depressed the mechanical capture button 23 or activated the software capture button 227 on the main screen 220.

When it is determined that the mechanical capture button 23 has been depressed halfway or the software capture button 227 on the main screen 220 has been activated, the CPU 131, in step S100, performs the AE process for the AE region 361.

Upon completion of the AE process, the CPU 131 causes the process to go to step S101, and controls the display control section 136 so as to notify the position of the spot metering pointer 260 and the termination of AE process and blink the spot metering pointer 260 displayed on the LCD 28 for the predetermined period of time. After completing the blink, the CPU 131 causes the process to go to step S102.

In step S99, when it is determined that the mechanical capture button 23 has not been depressed halfway and the software capture button 227 on the main screen 220 has not activated, the CPU 131 skips processes of steps S100 and S101, and causes the process to go to step S102.

In step S102, based on the user's instructions etc., the CPU 131 determines whether or not to terminate the spot AE process. When it is determined not to terminate it, the CPU 131 returns the process to step S91 of FIG. 22, and the processes thereafter are repeated.

In step S102, when it is determined to terminate the spot AE process, after performing the termination process in step S103, the CPU 131 terminates the spot AE process.

According to the spot metering mode as described above, the user may easily obtain the still image having been treated with the spot AE process with respect to an arbitrary position within the shooting frame.

Next, as shown in FIG. 21D, the AF process and the AE process will be described for the case where the spot metering pointer 260 is always located at the center of the AE frame 261.

Figure 24:
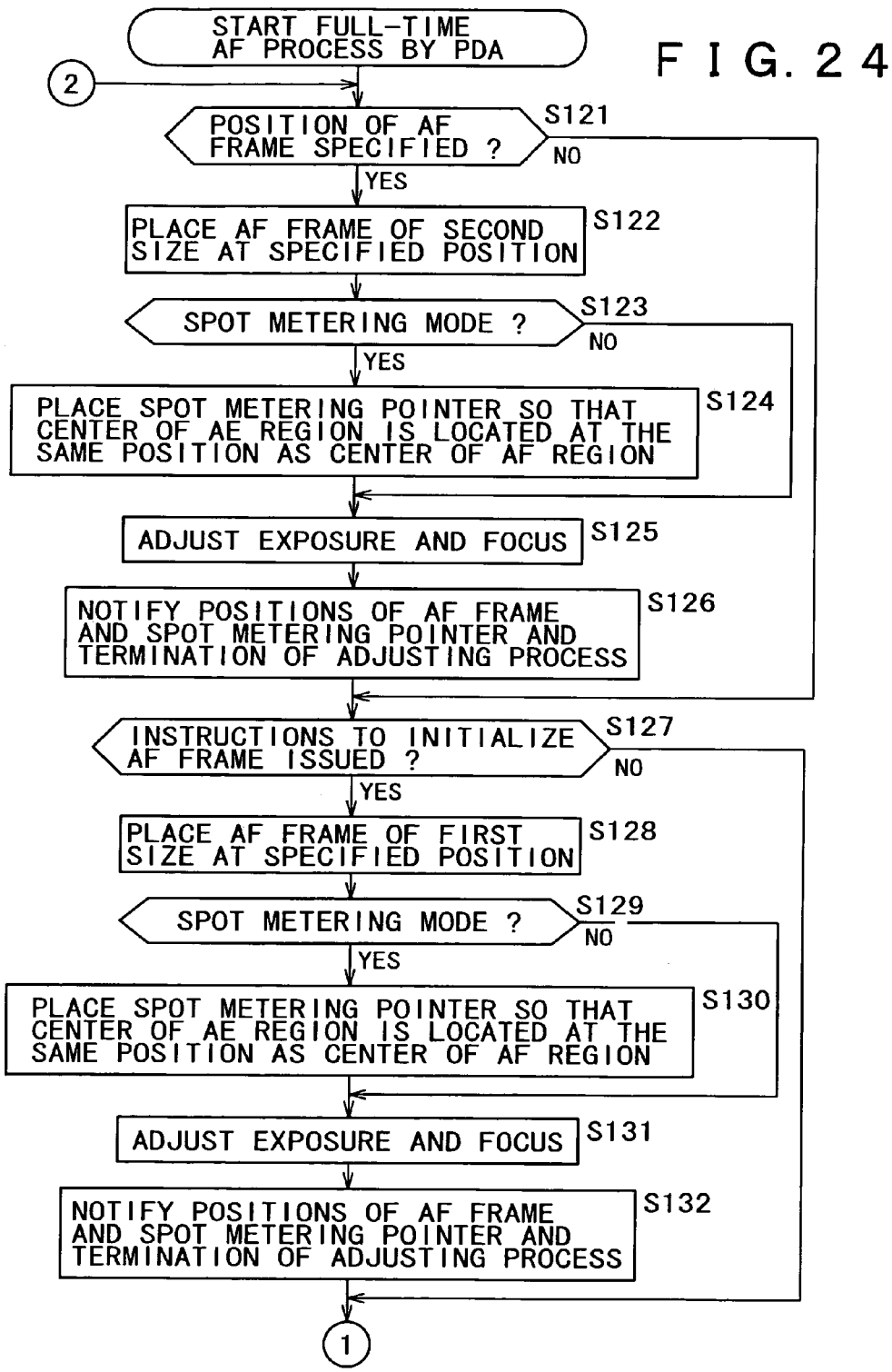
FIG. 24 is a flow chart for explaining another example of the full-time AF process of the PDA of FIG. 1.

At first, with reference to flow charts of FIG. 24 and FIG. 25, the full-time AF process will be described which is performed in the case of the full-time AF mode as described above. In this case, as with the case of the full-time AF mode as described above, in the initial state (state where the user does not specify the position of the AF frame 261), the AF frame 261 of the first size indicating the range of the larger AF region is arranged in the EVF area 221 so that the center of the AF frame 261 may be located at the center of the EVF area 221. Further, in the case of the spot metering mode, as shown in FIG. 21B, the spot metering pointer 260 is disposed at the center of the EVF area 221.

In step S121, the CPU 131 controls the touch panel 36 and determines whether or not the position of the AF frame 261 has been specified by the user as shown in FIG. 21D. When the user taps on the EVF area 221 of the LCD 28 once, the touch panel 36 detects it and supplies its position information to the CPU 131.

When the position information on the position where the tap was performed from the touch panel 36 is supplied and it is determined that the position of the AF frame 261 have been specified, the CPU 131 causes the process to go to step S122 and places the AF frame of the second size smaller than the first size in the specified the position, based on the supplied position information.

In step S123, the CPU 131 determines whether or not the mode of AE is the spot metering mode. When it is determined to be the spot metering mode, in step S124 the spot metering pointer 260 is arranged so that the center of the AE region 361 may be located at the same position as the center of the AF region. Having arranged the spot metering pointer 260, the CPU 131 causes the process to go to step S125.

In step S123, when it is determined not to be the spot metering mode, the CPU 131 skips the process of step S124 and causes the process to go to step S125.

In step S125, based on the position information, supplied from the CPU 131, on the AF region and the AE region 361, the camera control section 210 adjusts a focus for the AF region surrounded by the arranged AF frame 261 by means of the TTL contrast detection system and also adjusts the exposure for the arranged AE region 361.

Upon completion of the focus adjustment and the exposure adjustment, the CPU 131 causes the process to go to step S126 and controls the display control section 136 so as to notify the positions of the AF frame 261 and the spot metering pointer 260 and the termination of the adjusting processes and blink, for a predetermined period of time, the AF frame 261 and the spot metering pointer 260 which are displayed on the LCD 28. After completing the blink, the CPU 131 causes the process to go to step S127.

In step S121, if the position information has not been supplied from the touch panel 36 and it is determined that the position of the AF frame 261 has not been specified, the CPU 131 skips the processes step S122 to S126, and causes the process to go to step S127.

In step S127, the CPU 131 controls the touch panel 36 and determines whether or not the instructions to initialize the AF frame 261 have been issued by the user. When the user does the double-tap on the EVF area 221 of the LCD 28, the touch panel 36 detects it and supplies its information to the CPU 131.

When the information on the double-tap is supplied from the touch panel 36 and it is determined that the instructions to initialize the AF frame 261 have been issued, the CPU 131 causes the process to go to step S128 and places the AF frame 261 of the first size of in the initial position.

In step S129, the CPU 131 determines whether or not the mode of AE is the spot metering mode. When it is determined to be the spot metering mode, in step S130 the spot metering pointer 260 is arranged so that the center of the AE region 361 is located at the same position as the center of the AF region. Having arranged the spot metering pointer 260, the CPU 131 causes the process to go to step S131.

In step S129, when it is determined not to be the spot metering mode, the CPU 131 skips the process of step S130 and causes the process to go to step S131.

In step S131, based on the position information, supplied from the CPU 131, about the AF frame 261 and the spot metering pointer 260, the camera control section 210 adjusts the focus for the AF region surrounded by the arranged AF frame 261 by means of the TTL contrast detection system and adjusts the exposure with respect to the AE region 361.

Upon completion of those adjusting processes, the CPU 131 causes the process to go to step S132 and controls the display control section 136 so as to notify the positions of the AF frame 261 and the spot metering pointer 260 and the termination of the adjusting processes and blink, for the predetermined period of time, the AF frame 261 and the spot metering pointer 260 which are displayed on the LCD 28. After completing the blink, the CPU 131 causes the process to go to step S133 of FIG.25.

Figure 25:
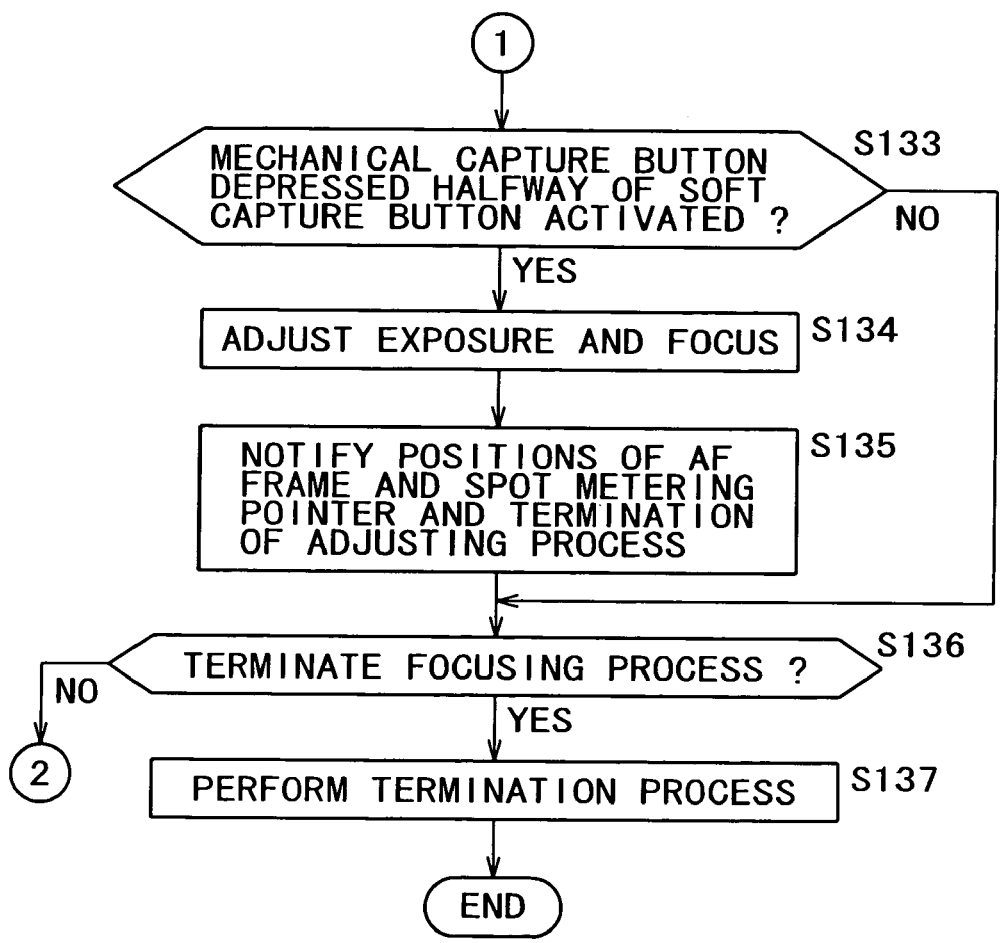
FIG. 25 is a flow chart following FIG. 24 for explaining another example of the full-time AF process of the PDA of FIG. 1.

In step S127, when it is determined that the instructions to initialize the AF frame 261 have not been issued by the user, the CPU 131 skips the processes of steps S128 to S132, and causes the process to go to step S133 of FIG. 25.

In step S133 of FIG. 25, the CPU 131 monitors the touch panel 36 and the input section 137, and determines whether the mechanical capture button 23 has been depressed halfway or the software capture button 227 on the main screen 220 has been activated by the user.

When it is determined that the mechanical capture button 23 has been depressed halfway or the software capture button 227 on the main screen 220 has been activated, the CPU 131, in step S134, adjust the focus for the AF region surrounded by the AF frame 261 by means of the TTL contrast detection system and adjusts the exposure with respect to the AE region 361.

Upon completion of the adjusting processes, the CPU 131 causes. the process to go to step S135, and controls the display control section 136 so as to notify the positions of the AF frame 261 and the spot metering pointer 260 and the termination of adjusting process and blink, for the predetermined period of time, the AF frame 261 and the spot metering pointer 260 which are displayed on the LCD 28. After completing the blink, the CPU 131 causes the processing to go to step S136.

In step S133 if it is determined that the mechanical capture button 23 has not been half depressed and the software capture button 227 on the main screen 220 has not been activated, the CPU 131 skips the processes of steps S134 and S135 and causes the process to go to step S136.

In step S136, based on the user's instructions etc., the CPU 131 determine whether or not to terminate the focusing process. When it is determined not to terminate it, the CPU 131 returns the process to step S121 of FIG. 24, and the processes thereafter are repeated.

In step S136, when it is determined to terminate the focusing process, the CPU 131 carries out the termination process in step S137, then terminates the full-time AF process.

According to such a full-time AF mode, as for an image of any composition, the user may easily obtain the still image which has been treated with the more effective AE process and the more suitable AF process.

Now, with reference to flow charts of FIG. 26 and FIG. 27, the one shot AF process will be described which is an AF process in the case of the one shot AF mode as described above. As described above, even in the initial state in one shot AF mode (state where the user has not specified the position of the AF frame 261), as with the case of the full-time AF mode, as shown in FIG. 21B, the AF frame 261 of the first size indicating the range of the larger AF region is provided in the EVF area 221 so that the center of the AF frame 261 may be located at the center of the EVF area 221. Further, when it is in the spot metering mode, as shown in FIG. 21B, the spot metering pointer 260 is arranged at the center of the EVF area 221.

In step S151, the CPU 131 controls the touch panel 36 and determines whether or not the position of the AF frame 261 has been specified by the user, as shown in FIG. 21D. When the user taps on the EVF area 221 of the LCD 28 once, touch panel 36 detects it and supplies its position information to the CPU 131.

When the position information on the position where the tap has been carried out is supplied from the touch panel 36 and it is determined that the position of the AF frame 261 has been specified, the CPU 131 causes the process to go to step S152 and places the AF frame of the second size smaller than the first size in the specified position, based on the supplied position information.

In step S153, the CPU 131 determines whether or not the mode of AE is the spot metering mode. When it is determined to be the spot metering mode, in step S154, the spot metering pointer 260 is arranged so that the center of the AE region 361 may be located at the same position as the center of the AF region. Having arranged the spot metering pointer 260, the CPU 131 causes the process to go to step S155.

In step S153, when it is determined not to be the spot metering mode, the CPU 131 skips the process of step S154 and causes the process to go to step S155.

In step S155, a CPU 131 supplies the position information on the AF frame 261 to the camera control section 210 of the camera section 22. Based on the position information, the camera control section 210 adjusts the focus for the AF region surrounded by the arranged AF frame 261 by means of the TTL contrast detection system and carries out the AE process with respect to the AE region 361 so as to adjust the exposure.

Upon completion of the adjusting processes, the CPU 131 causes the process to go to step S156 and controls the display control section 136 so as to notify the positions of the AF frame 261 and the spot metering pointer 260 and the termination of adjusting process and blink, for the predetermined period of time, the AF frame 261 and the spot metering pointer 260 which are displayed on the LCD 28.

In step S157, at the time when the adjusting processes are completed, the CPU 131 controls the camera control section 210 so as to fix the aperture and the lens position of the lens section 201 and fix the exposure and the focus. Further, in step S158, the CPU 131 disables the half-depression process which is performed by operating the mechanical capture button 23 and the software capture button 227.

Figure 27:
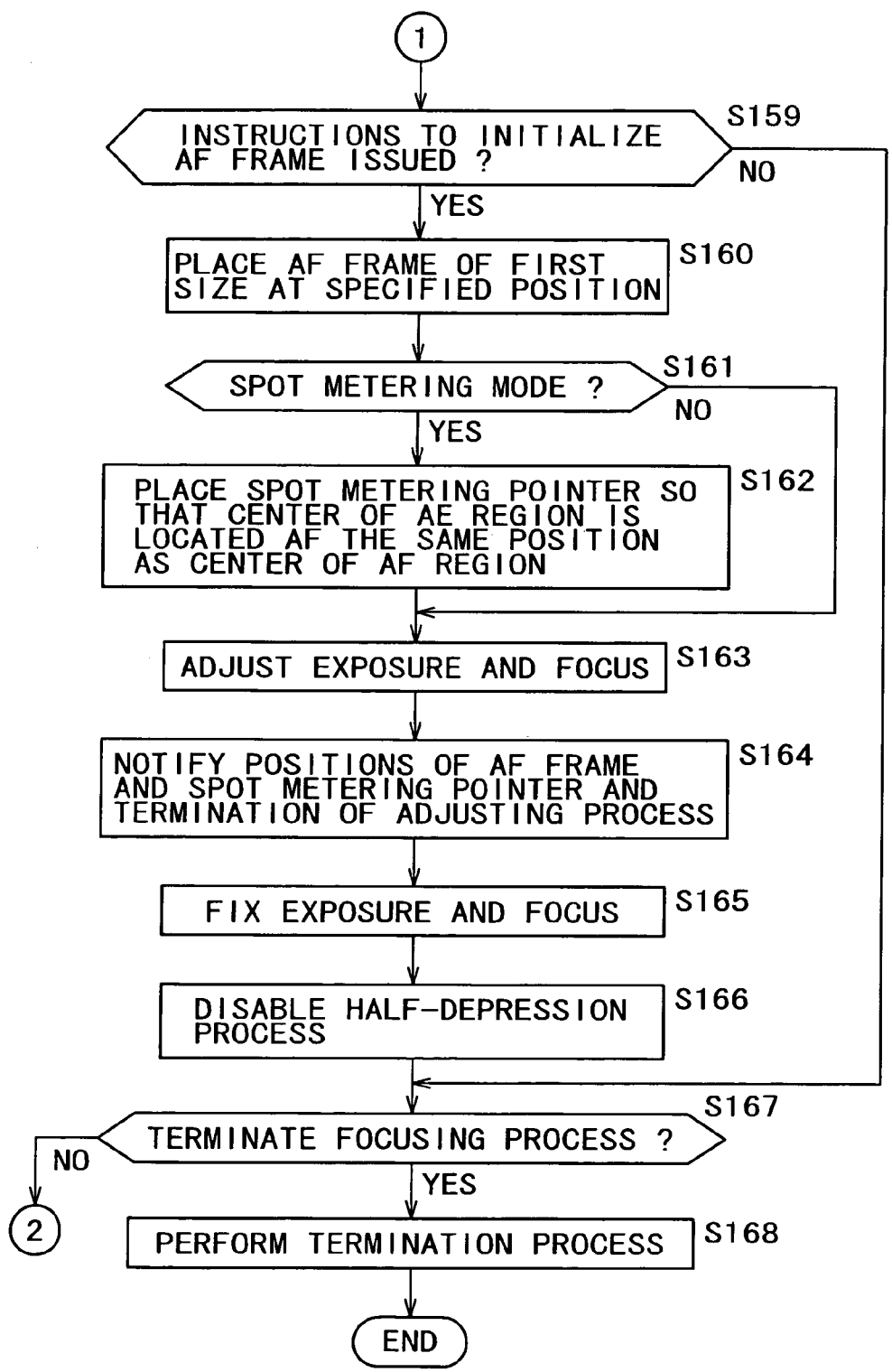
FIG. 27 is a flow chart following FIG. 26 for explaining another example of the one shot AF process of the PDA of FIG. 1.

Having disabled the half-depression process, the CPU 131 causes the process to go to step S159 of FIG. 27.

Figure 26:
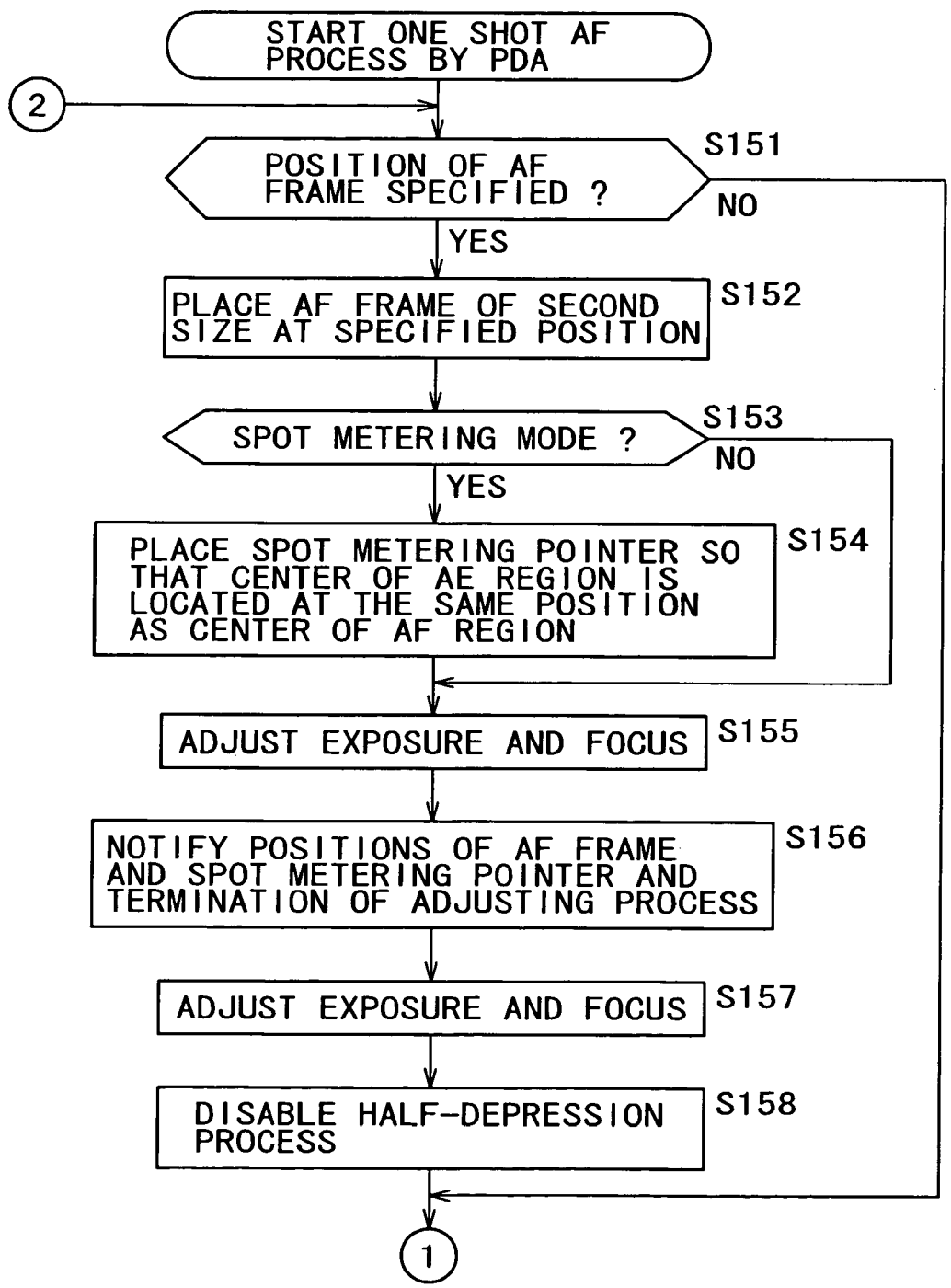
FIG. 26 is a flow chart for explaining another example of the one shot AF process of the PDA of FIG. 1.

In step S151 of FIG. 26, when the position information has not been supplied from the touch panel 36 and it is determined that the position of the AF frame 261 has not been specified, the CPU 131 skips the processes of steps S152 to S158 and causes the process to go to step S159 of FIG. 27.

In step S159 of FIG. 27, the CPU 131 controls the touch panel 36 and determines whether or not the instructions to initialize the AF frame 261 have been issued by the user. When the user does the double-tap on the EVF area 221 of the LCD 28, the touch panel 36 detects it and supplies its information to the CPU 131.

When the information on the double-tap has been supplied from the touch panel 36 and it is determined that the instructions to initialize the AF frame 261 have been issued, the CPU 131 causes the process to go to step S160 and places the AF frame of the first size in the initial position.

In step S161, the CPU 131 determines whether or not the mode of AE is the spot metering mode. When it is determined to be the spot metering mode, in step S162 the spot metering pointer 260 is arranged so that the center of the AE region 361 is located at the same position as the center of AF region. Having arranged the spot metering pointer 260, the CPU 131 causes the process to go to step S163.

In step S161, when it is determined not to be the spot metering mode, the CPU 131 skips the process of step S162 and causes the process to go to step S163.

In step S163, as for the AF region surrounded by the arranged AF frame 261, the camera control section 210 adjusts the focus by means of the TTL contrast detection system and carries out the AE process for the AE region 361 so as to adjust the exposure.

Upon completion of the adjusting processes, the CPU 131 causes the process to go to step S164 and controls the display control section 136 so as to notify the positions of the AF frame 261 and the spot metering pointer 260 and the termination of the adjusting processes and blink, for the predetermined period of time, the AF frame 261 and the spot metering pointer 260 displayed on the LCD 28.

As with the cases in steps S157 and S158, the CPU 131, in step S165, controls the camera control section 210 at the time when the adjusting process is completed so as to fix the aperture and the lens position of the lens section 201 and fix the exposure and the focal position. In step S166, the CPU 131 disables the half-depression process by operating the mechanical capture button 23 and the software capture button 227, then causes the process to go to step S167.

In step S159, when it is determined that the instructions to initialize the AF frame 261 have not been issued by the user, the CPU 131 skips the processes of steps S160 to S166 and causes the process to go to step S167.

In step S167, based on the user's instructions etc., the CPU 131 determines whether or not to terminate the focusing process. When it is determined not to terminate it, the CPU 131 returns the process to step S151 of FIG. 26 and processes thereafter are repeated.

In step S167, when it is determined to terminate the focusing process, the CPU 131 performs the termination process in step S168, then terminates the one shot AF process.

According to such a one shot AF mode, as for the shooting with so-called "locked focus", the user may easily obtain the still image which has been treated with the more suitable AF process and the more effective AE process.

In the above description, the AF process has been described as being carried out by using the TTL contrast detection system, however, other methods for the AF process may be employed. For example, various kinds of active systems which measure a distance to the photographic subject by emitting infrared rays or an ultrasonic wave, a TTL phase difference detection system in which a light passed through a shooting lens is divided into two, and a quantity of the difference between the two and their directions are detected to as to detect a focus position, etc., may be employed.

The termination of adjusting processes such as the AF process and the AE process has been described as notifying by blinking the AF frame 261 and the spot metering pointer 260, but is not limited thereto. Another indicator may be used, or a check sound may be outputted. Further, a plurality of methods may be combined.

Further, the check sound may be outputted every time another process is performed, such as when the focus mode is changed, when the still image is captured, etc., for example. In that case, contents of the check sound may be altered depending on the process to which the check sound corresponds.

The user's designation of the position of the AF region or the AE region has been described as being carried out in the center of each region, but is not limited thereto. For example, any position in the region, such as the coordinates of the upper right end of the region etc., may be specified. Further, the AF region or the AE region may be shifted so that the coordinates specified by the user may be located outside the region.

The user's designation of the position of the AF region or the AE region has been described as being initialized when the user does the double-tap on the EVF area 221, but is not limited thereto. The initialization may be carried out when the user taps on the EVF area 221 for more than the predetermined period of time, or when the still image is captured.

The above description has been made by using the PDA with the imaging function, but is not limited thereto. Any electronic device may be employed which includes the image function including an AF function and an AE function and further a display for displaying the acquired image, such as the digital still camera and a portable telephone having the imaging function, for example.

Therefore, an electric device, such as a cross key, equipped with an input section by which the position of the AF frame 261 or the spot metering pointer can be moved freely may be employed even if the touch panel is not overlapped on the display as described in the above examples. In particular, the PDA, a notebook type personal computer, etc. having the imaging function, in which the touch panel is overlapped on the display, may easily carry out operations for the AF frame 261 and the spot metering pointer.

In the above description, a camera 22 and the LCD 28 etc. have been described as being constructed as one set of PDA, but are not limited thereto. Each part of the PDA 1 as described above may be separately constituted.

In the example as described above, although the memory mounted in the slot 64 was a memory card 143, any recording medium applicable to the slot 64 may be used. For example, a semiconductor memory, a magnetic disk, an optical disk, or a magneto-optical disk etc. (which are not shown) may be employed.

The above processes may be performed by means of hardware and also by means of software. When a series of processes are performed by the software, a computer program which constitutes the software is installed to the PDA 1 through a network or a recording medium. However, the recording medium may be mounted not only directly to the PDA 1 but also to another device as needed. In this case, the another device may communicate with the PDA 1 mutually so as to install the computer program to the PDA 1.

As shown in FIG. 8, this recording medium may be constituted by a package media including not only the semiconductor memory such as a memory stick 143 in which the computer program is stored and which is distributed separately from the main body of the device in order to supply the computer program to the user but also the magnetic disk (including a floppy disk), an optical disk (including a CD-ROM (Compact Disk-Read only Memory) and a DVD (Digital Versatile Disk)), a magneto-optical disk (including an MD (Mini-Disk)), etc., for example, which are not shown. Further, it may be constituted by the ROM 132 having stored therein the computer program and being installed in advance in the main body of the device so as to be supplied to the user or constituted by the storage section 139 as the EEPROM or the hard disk, for example.

In the above description, although the processes shown in each flow chart have been performed by the CPU 131 of FIG. 8 by means of the software, of course, the hardware which performs each process may be provided so that it is performed by the hardware.

It should be noted that, in the present specification, the step which describes the computer program recorded on the recording medium includes not only the process chronologically performed in accordance with the described order but also the process performed in parallel or individually if it is not necessarily processed chronologically.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging method comprising:
   imaging a subject and capturing an image of the subject;
   adjusting a focal length and focusing on the subject which is included in a first predetermined region within an imaging range;
   receiving a user designation regarding a position in the first region within the imaging range; and
   setting the first region initially at a first range and at a position within the imaging range, whereby a center of the first region is located at a center of the imaging range if the user designation is not received, and upon receiving the user designation, the center of the first region being located at specified coordinates and the range of the first region being set up is smaller than the first range, and upon receiving a further user designation, returning the center of the first region to the center of the imaging range and the range of the first region to the first range.

2. The imaging method according to claim 1, further comprising:
   displaying a moving image obtained by imaging of the subject.

3. The imaging method according to claim 2, further comprising:
   initializing the setup of the first region and returning the setup from a state where the user designation is received, to a state where the user designation is not received, wherein:
   the received designation further receives an instruction to initialize the setup of the first region with a second method, and
   the initialization instruction initializes the setup of the first region based on the instruction received.

4. The imaging method according to claim 1, wherein:
   the focusing adjusts the focal length and focus on the subject if the imaging takes in a still image and if the setting sets up the position of the first region.

5. The imaging method according to claim 4, further comprising:
   prohibiting an adjusting process of the focusing if the focusing focuses on the subject that is included in the first region and if the imaging takes in the still image.

6. The imaging method according to claim 1, further comprising:
   adjusting an exposure for a second predetermined region within the imaging range,
   wherein the setting sets up a position of the second region so that a center of the second region is positioned at a center of the first region that is set at an arbitrary position within the imaging range based on the user designation.

7. The imaging method of claim 1, wherein:
   if the user designation is received, the range of the first region setup is always smaller than that of the case that the user designation is not received.

8. A computer readable memory including computer executable instructions, wherein the instructions, when executed by a processor, cause the processor to perform an imaging process, the imaging process comprising:
   imaging a subject to be imaged and capturing an image of the subject;
   adjusting a focal length and focusing on the subject which is included in a first predetermined region within an imaging range;
   receiving a user designation regarding a position in the first region within the imaging range;
   a display step for displaying an autofocus frame corresponding to the first region; and
   setting the first region initially at a first range and at a position within the imaging range whereby a center of the first region is located at a center of the imaging range if the user designation is not received, wherein
   a center of the first region is located at specified coordinates if the user designation is received; and
   the range of the first region being set up whereby, if the user designation is received, the range of the first region set up is smaller than the first range, and upon receiving a further user designation, returning the center of the first region to the center of the imaging range and the range of the first region to the first range.

9. The computer readable memory including computer executable instructions of claim 8, further comprising:
   displaying the image obtained by imaging of the subject.

10. The computer readable memory including computer executable instructions, according to claim 9, further comprising:
    initializing the setup of the first region and returning the setup from a state where the user designation is received, during receiving to a state where the user designation is not received;
    wherein the receiving further receives an instruction to initialize the setup of the first region with a second method, and
    the initialization instruction initializes the setup of the first region based on the instruction received during receiving.

11. The computer readable memory including computer executable instructions, according to claim 8, wherein:
the focusing adjusts the focal length and focus on the subject if the imaging takes in a still image and if the setting sets up the position of the first region.

12. The computer readable memory including computer executable instructions, according to claim 11, further comprising:
prohibiting an adjusting process of the focusing if the focusing focuses on the subject that is included in the first region and if the imaging takes in the still image.

13. The computer readable memory including computer executable instructions, according to claim 8, further comprising:
adjusting an exposure for a second predetermined region within the imaging range,
wherein the setting sets up a position of the second region so that a center of the second region is positioned at a center of the first region that is set at an arbitrary position within the imaging range based on the user designation received during receiving.

14. The computer readable memory including computer executable instructions, according to claim 8, wherein:
if a user designation is received, the range of the first region setup is always smaller than that of a case that the user designation is not received.

15. An imaging apparatus comprising:
imaging means for imaging a subject to be imaged and capturing an image of the subject;
focusing means for adjusting a focal length and focusing on the subject which is included in a first predetermined region within an imaging range of the imaging means;
reception means for receiving a user designation regarding a position at the first region within the imaging range;
position setting means for setting the first region initially at a first range and at a position within the imaging range, whereby a center of the first region is located at a center of the imaging range, and upon receiving the user designation, the center of the first region is located at specified coordinates if the position designation is received by the reception means; and
range setting means for setting up a range of the first region in such a way that, if the user designation is received by the reception means, the range of the first region set up is smaller than the first range, and upon receiving a further user designation, returning the center of the first region to the center of the imaging range and the range of the first region to the first range.

16. The imaging apparatus according to claim 15, further comprising:
display means for displaying a moving image obtained by imaging of the subject by the imaging means.

17. The imaging apparatus according to claim 16, further comprising:
initialization means for initializing the setup of the first region and returning the setup from a state where the user designation is received by the reception means to a state where the user designation is not received, wherein:
the reception means further receives an instruction to initialize the setup of the first region with a second method, and
the initialization means initialize the setup of the first region based on the instruction received by the reception means.

18. The imaging apparatus according to claim 15, wherein:
the focusing means adjust the focal length and focus on the subject if the imaging means take in a still image and if the position setting means set up the position of the first region.

19. The imaging apparatus according to claim 18, further comprising:
prohibition means for prohibiting an adjusting process of the focusing means if the focusing means focus on the subject that is included in the first region and if the imaging means takes in the still image.

20. The imaging apparatus according to claim 15, further comprising:
exposure adjustment means for adjusting an exposure for a second predetermined region within the imaging range,
wherein the position setting means set up a position of the second region so that a center of the second region is positioned at a center of the first region that is set at an arbitrary position within the imaging range based on the user designation received by the reception means.

21. The imaging apparatus of claim 15, wherein:
if the user designation is received, the range of the first region setup is always smaller than that of a case that the user designation is not received.

22. An imaging apparatus comprising:
imaging means for imaging a subject to be imaged and capturing an image of the subject;
focusing means for adjusting a focal length and focusing on the subject which is included in a first predetermined region within an imaging range of the imaging means;
reception means for receiving a user designation regarding a position at the first region within the imaging range;
position setting means for setting the first region initially at a first range and at a position within the imaging range, whereby a center of the first region is located at a center of the imaging range, and upon receiving the user designation, the center of the first region is located at specified coordinates if the position designation is received by the reception means;
range setting means for setting up a range of the first region whereby if the user designation is received by the reception means, the range of the first region set up is smaller than the first range, and upon receiving a further user designation, returning the center of the first region to the center of the imaging range and the range of the first region to the first range; and
prohibition means for prohibiting adjustment of the focal length by the focusing means,
wherein the focusing means adjust the focal length and focus on the subject if the imaging means take in a still image and if the position setting means set up the position of the first region; and
the prohibition means prohibit the adjustment of the focusing means if the focusing means focus on the subject that is included in the first region and if the imaging means takes in the still image.

23. The imaging apparatus according to claim 22, further comprising:
display means for displaying a moving image obtained by imaging of the subject by the imaging means.

24. The imaging apparatus according to claim 23, further comprising:
initialization means for initializing the setup of the first region and returning the setup from a state where the user designation is received by the reception means to a state where the position designation is not received;

wherein the reception means further receives an instruction to initialize the setup of the first region with a second method, and the initialization means initialize the setup of the first region based on the instruction received by the reception means.

25. The imaging apparatus according to claim 22, further comprising:

exposure adjustment means for adjusting an exposure for a second predetermined region within the imaging range, wherein the position setting means set up a position of the second region so that a center of the second region is positioned at a center of the first region that is set at an arbitrary position within the imaging range based on the user designation received by the reception means.

26. The imaging apparatus of claim 22, wherein:

if the user designation is received, the range of the first region setup is always smaller than that of a case that the user designation is not received.

27. An imaging apparatus comprising:

an imaging section for imaging a subject to be imaged and capturing an image of the subject;

a focusing section configured to adjust a focal length and focusing on the subject which is included in a first predetermined region within an imaging range of the imaging section;

a reception section configured to receive a user designation regarding a position in the first region within the imaging range;

a position setting section configured to set the first region initially at a first range and at a position within the imaging range, whereby a center of the first region is located at a center of the imaging range, and upon receiving the user designation, the center of the first region is located at specified coordinates if the user designation is received by the reception section; and a range setting section sets up the range of the first region whereby, if the user designation is received by the reception section, the range of the first region set up is smaller than the first range, and upon receiving a further user designation, returning the center of the first region to the center of the imaging range and the range of the first region to the first range.

28. The imaging apparatus according to claim 27, further comprising:

a display section configured to display a moving image obtained by imaging of the subject by the imaging section.

29. The imaging apparatus according to claim 28, further comprising:

an initialization section configured to initialize the setup of the first region and to return the setup from a state where the user designation is received by the reception section to a state where the user designation is not received;

wherein the reception section is further configured to receive an instruction to initialize the setup of the first region with a second method, and the initialization section is configured to initialize the setup of the first region based on the instruction received by the reception section.

30. The imaging apparatus according to claim 27, further comprising:

an exposure adjustment section configured to adjust an exposure for a second predetermined region within the imaging range, wherein the position setting section sets up a position of the second region so that a center of the second region is positioned at a center of the first region that is set at an arbitrary position within the imaging range based on the user designation received by the reception section.

31. The imaging apparatus of claim 27, wherein:

if the user designation is received, the range of the first region setup is always smaller than that of a case that the user designation is not received.

* * * * *